US008605046B2

(12) United States Patent
Lu

(10) Patent No.: US 8,605,046 B2
(45) Date of Patent: Dec. 10, 2013

(54) SYSTEM AND METHOD FOR PROVIDING MULTI-DIMENSIONAL TOUCH INPUT VECTOR

(75) Inventor: Fei Lu, San Jose, CA (US)

(73) Assignee: PQ Labs, Inc., San Jose, CA (US)

( * ) Notice: Subject to any disclaimer, the term of this patent is extended or adjusted under 35 U.S.C. 154(b) by 286 days.

(21) Appl. No.: 12/910,704

(22) Filed: Oct. 22, 2010

(65) Prior Publication Data

US 2012/0098753 A1 Apr. 26, 2012

(51) Int. Cl.
*G06F 3/041* (2006.01)
*G06F 3/042* (2006.01)
*G02B 27/10* (2006.01)
*G06K 11/06* (2006.01)

(52) U.S. Cl.
USPC .............. 345/173; 345/175; 359/627; 178/18

(58) Field of Classification Search
USPC ................................................ 345/173–175
See application file for complete search history.

(56) References Cited

U.S. PATENT DOCUMENTS

| 5,736,686 | A | * | 4/1998 | Perret et al. ................ 178/18.11 |
| 7,688,455 | B2 | | 3/2010 | Kim et al. |
| 2001/0055006 | A1 | | 12/2001 | Sano et al. |
| 2003/0156332 | A1 | * | 8/2003 | Seino et al. .................... 359/627 |
| 2004/0140960 | A1 | * | 7/2004 | Cok ............................... 345/175 |
| 2004/0208385 | A1 | | 10/2004 | Jiang |
| 2005/0094902 | A1 | | 5/2005 | Zhang et al. |
| 2006/0274070 | A1 | | 12/2006 | Herman et al. |
| 2007/0206008 | A1 | | 9/2007 | Kaufman et al. |
| 2008/0024470 | A1 | | 1/2008 | Andre et al. |
| 2008/0211779 | A1 | | 9/2008 | Pryor |
| 2009/0135162 | A1 | * | 5/2009 | Van De Wijdeven et al. 345/175 |
| 2009/0256811 | A1 | | 10/2009 | Pasquariello |
| 2009/0278816 | A1 | | 11/2009 | Colson |
| 2010/0201637 | A1 | * | 8/2010 | Herne et al. .................. 345/173 |

FOREIGN PATENT DOCUMENTS

WO 2010081702 A2 7/2010

OTHER PUBLICATIONS

Website printout: Citron, "DreamTouch", product announcement, Sep. 28, 2009, 3 pages.

* cited by examiner

*Primary Examiner* — Alexander Eisen
*Assistant Examiner* — Amit Chatly
(74) *Attorney, Agent, or Firm* — Schneck & Schneck; Thomas Schneck; Mark Protsik

(57) ABSTRACT

A touch panel method and system detects one or more touch objects placed on a surface of a touch panel and assigns consistent ID, position, size and convex contour to each touch object. The method and system allows multiple simultaneous touch objects on the touch panel to be distinguished. The touch panel includes on its periphery at least one light transmitter and at least one light sensor, each positioned around at least a portion of a perimeter of the touch panel. A processor in communication with the at least one light sensor acquires light intensity data from the sensor(s), wherein any one or more touch objects placed within a touch detectable region of the panel interrupts at least a subset of light paths between transmitter and sensor. Based on the interrupted light paths, the processor generates a touch input vector (assigned ID and spatial properties) that represents the placement of each touch object on the touch panel.

9 Claims, 29 Drawing Sheets

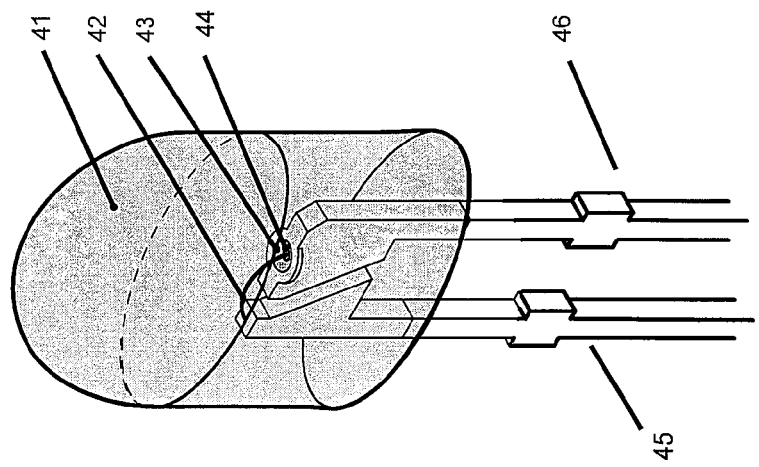
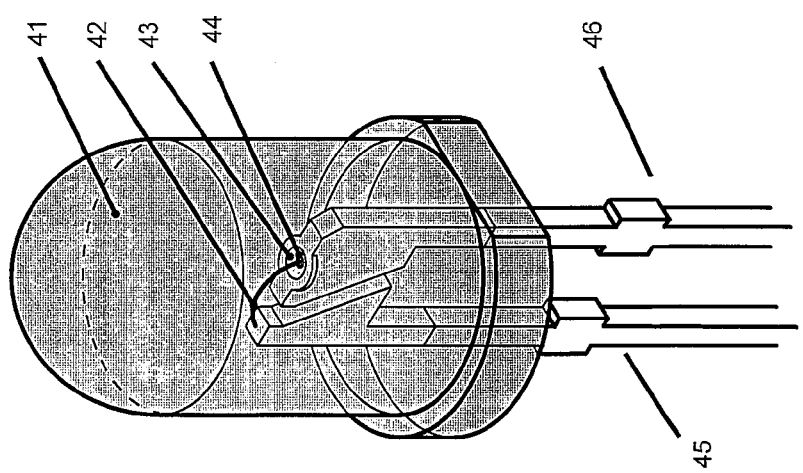

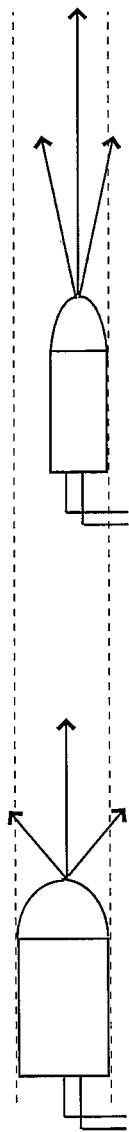
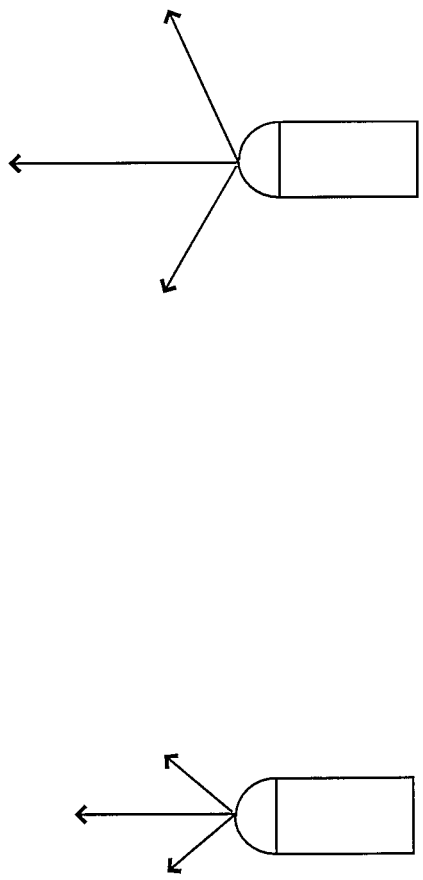
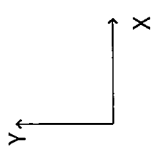
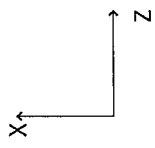

SYSTEM AND METHOD FOR PROVIDING MULTI-DIMENSIONAL TOUCH INPUT VECTOR

TECHNICAL FIELD

The present invention relates to techniques for enabling feature rich sensing of id, position, size and the convex contour of one or multiple touch objects placed on the surface of a touch panel.

BACKGROUND ART

A touch panel is a type of user interface device that may be attached to a surface of a display device or a projection surface. Traditional touch panels, although widely used, is unable to detect multiple fingers or objects on a surface. If two or more fingers are simultaneously touched, the touch panel may stop working or it may report only one of the touch positions or an inaccurate phantom touch position.

The interface of controlling a machine using multiple fingers has a long history even before the computer was invented (e.g. piano, control panel, DJ mixer, etc). As computers become available to more populations and become increasing powerful, the human computer interface has evolved more and more natural to the users representing real interactions in our physical world. In the early days, computers used punched cards as input. Later, console and keyboard interface was introduced. However, at that time, computer users were still limited to programmers and trained staffs because users had to remember all the command and parameters in order to interact with computers. The use of WIMP (Window, Icon, Menu, Pointing device) greatly simplified the task. Virtual buttons including icons, menus represent physical operations in a 2D graphical way so that a pointing device (e.g. mouse, touch screen) can simulate clicks on it intuitively. However, unlike interactions in our real world, WIMP is limited to single point inputting device (e.g. the user can use mouse to point to only a single location at one time). This limitation results in serious inefficiency. One logical operation may require a series of mouse clicks and mouse moves. For example, a user may click on multiple levels of menus and move across the screen to access buttons, icons in order to perform one logical operation. Imagine if we have only one finger instead of ten in our everyday life, the life would be very difficult for us. In addition, WIMP is limited to single user, multi-user operation is not possible because only one mouse/pointing device is available system wide. The use of multi-pointing device (e.g. a touch screen that can detect locations of multiple fingers simultaneously) can significantly increase interaction efficiency and allows multi-user collaborations.

A traditional infrared touch panel comprises an array of light transmitters on two adjacent sides of the touch panel and an array of light detectors on the other two adjacent sides of the touch panel. Each light transmitter corresponds to one light detector on the opposite position. The transmitter and detector layout formed X and Y light beam paths, where a single finger touch on the surface will block one X light beam and one Y light beam. The touch coordinates and size of the touch area can then be determined by the intersection of the blocked X beam and Y beam. The problem associated with light beam matrix touch screen is that it cannot accurately detect multiple touch positions simultaneously. For example, if there are two fingers touching the surface at the same time, four light beam intersection points will be found. Two of the intersection points will be phantom points. The actual touch positions cannot be determined on such light beam matrix touch panel.

In short, the input vector generated by a traditional touch panel is a singleton <P1>, where P1 is the location of a touch point. It is therefore an object of the present invention to provide more dimensions and features of the touch property to allow sensible control and a new generation of interaction.

Singleton touch input vector generated by a traditional infrared touch panel:

<P1>

Multi-dimensional touch input vector generated by the present invention:

<
    <touch_id_1, P1, size1, convex_contour1>,
    <touch_id_2, P2, size2, convex_contour2>,
    <touch_id_3, P3, size3, convex_contour3>,
    ...
>

SUMMARY DISCLOSURE

The present invention provides apparatus and methods to detect ID, position, size and the convex contour of one or more objects placed on the surface of a touch panel.

According to an aspect of the present invention, a method for detecting an ID, position, size and convex contour of at least one touch object placed on a touch region W within a perimeter of a touch panel, the touch panel including on its periphery at least one light transmitter and at least one light sensor, said method comprises steps of:

(a) acquiring light intensity data from a subset of light paths L between at least one light transmitter and at least one light sensor of the touch panel, at least one of the light paths being interrupted by placement of at least one touch object within the touch region W;

(b) computing hot regions $H=\{h_i: i \leq NH$, where $h_i$ is the $i_{th}$ hot region$\}$ from a subset of said light intensity data by calculating the shape and boundary of interrupted light paths;

(c) computing expected object area S by overlaying said hot regions H and comparing it with a predetermined overlay region P;

(d) deriving totally disconnected expected object area S' from S;

(e) computing spatial properties, including position, size and convex contour, of said totally disconnected expected object area S';

(f) associating touch objects with a subset, of said totally disconnected expected object area S'; and (g) assigning to each said touch objects an ID and said spatial properties as a touch input vector representing the placement of each touch object on the touch panel.

According to another aspect of the present invention, a touch system for detecting an ID, position, size and convex contour of at least one object placed on a surface within a perimeter of a touch panel comprises:

at least one light transmitter positioned around at least a portion of the perimeter of said touch panel;

at least one light sensor positioned around at least a portion of the perimeter of said touch panel, wherein said at least one light sensor is of L-shape or linear shape, wherein at least one touch object placed on the surface within the perimeter of the touch panel interrupts at least a subset of light paths between said at least one light transmitter and said at least one light sensor.

According to one embodiment, the light sensor is a CIS (contact image sensor) module in L-shape or linear shape positioned around at least a portion of the perimeter of the touch panel.

According to one embodiment, the light transmitter comprises a LED semiconductor die and a lens wherein said lens has a wider x-axis view angle than y-axis view angle. This structure allows more energy to be focused and directed towards the light sensor array and reduces energy waste on other directions.

BRIEF DESCRIPTION OF THE DRAWINGS

FIG. 8, 9 show an improved LED lens designed for this invention.

DETAILED DESCRIPTION

Figure 1A:
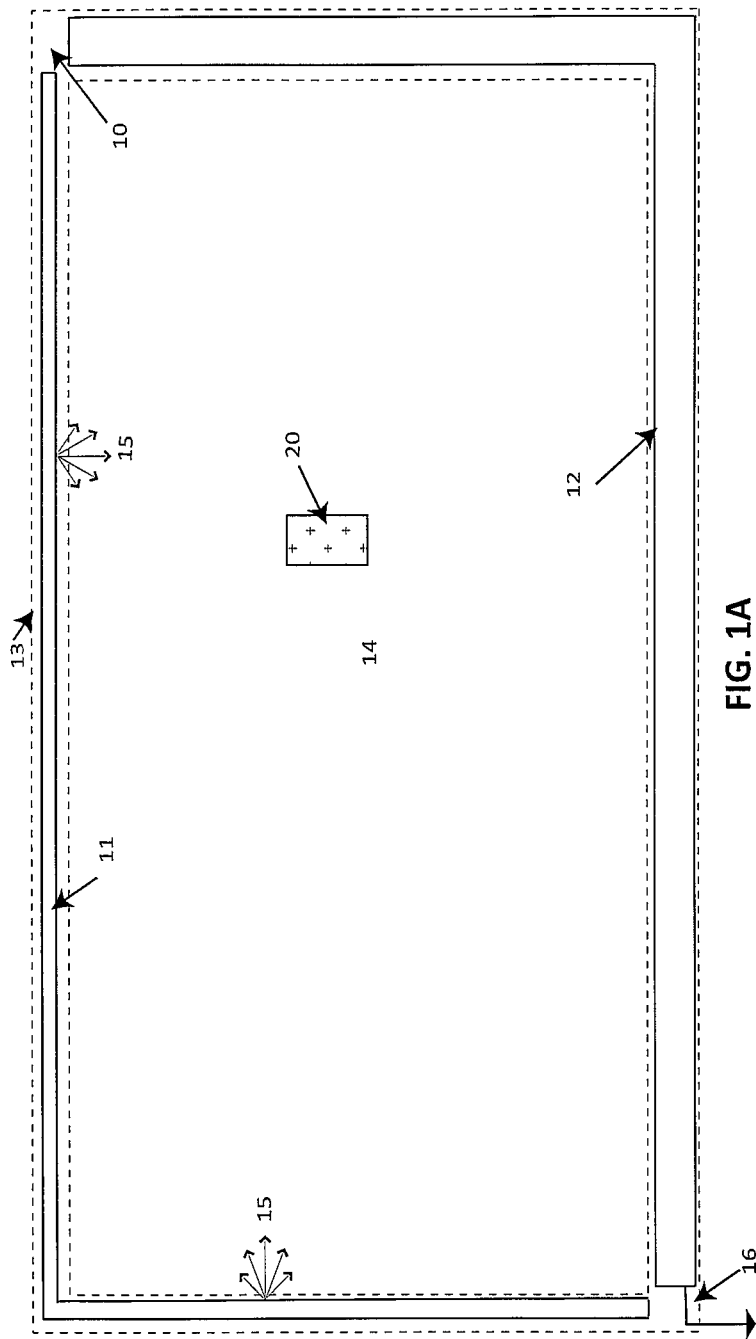
FIG. 1A, 1B show a touch panel with one light transmitter and one light sensor.
Figure 1B:

FIG. 1A-1B illustrates a first embodiment of a touch panel 13 in accord with the present invention, the touch panel in this case having one light transmitter 11 and one light sensor 12. A touch object T0 20 is located within the touch region W 14. The light transmitter 11 and light sensor 12 are assembled and fastened inside the bezel 10 of the touch panel 13. The light transmitter 11 is in L-shape. Light 15 is evenly emitted along the inner edge of the L-shape transmitter and spreads towards different parts of the touch region W 14. The L-shape light transmitter can be made of a single light fiber or a LED backlight structure. The L-shape light sensor is placed on the opposite sides of the light transmitter to detect the intensity of incoming light energy.

The L-shape light sensor outputs a series of analog or digital signals 16 to a processing unit, which produces a one-dimensional light intensity image 17 representing different light intensity detected along different part of the L-shape sensor. Conventional camera sensors cannot be used in this particular touch panel invention, because camera sensors are small in sizes and the sensor itself cannot be extended all the way along the perimeter of the touch panel.

For this particular touch panel invention, the L-shape light sensor can be a contact image sensor (CIS) customized for touch screen use. CIS is previously used for flatbed scanners and is not designed for touch screens. It has a fixed length for Letter or A4 paper size. The CIS for flatbed scanner is linear in shape and is moved by a motor line by line to scan 2D images. The resolution is also too high for touch screen applications causing sampling time to be longer. The ideal contact image sensor customized for touch screen application is a single L-shape sensor module with lower DPI and faster frame per second. In a preferred embodiment, the DPI should be equal or below 50 DPI. The internal optical lens of contact image sensor can be re-designed or completely removed under different configurations of this particular touch panel invention. For example, under the configuration shown in FIG. 1A, the optical lens of contact image sensor can be designed with very narrow view angles. For another example, under the configuration shown in FIG. 2, the optical lens of contact image sensor can be completely removed.

Figure 2:
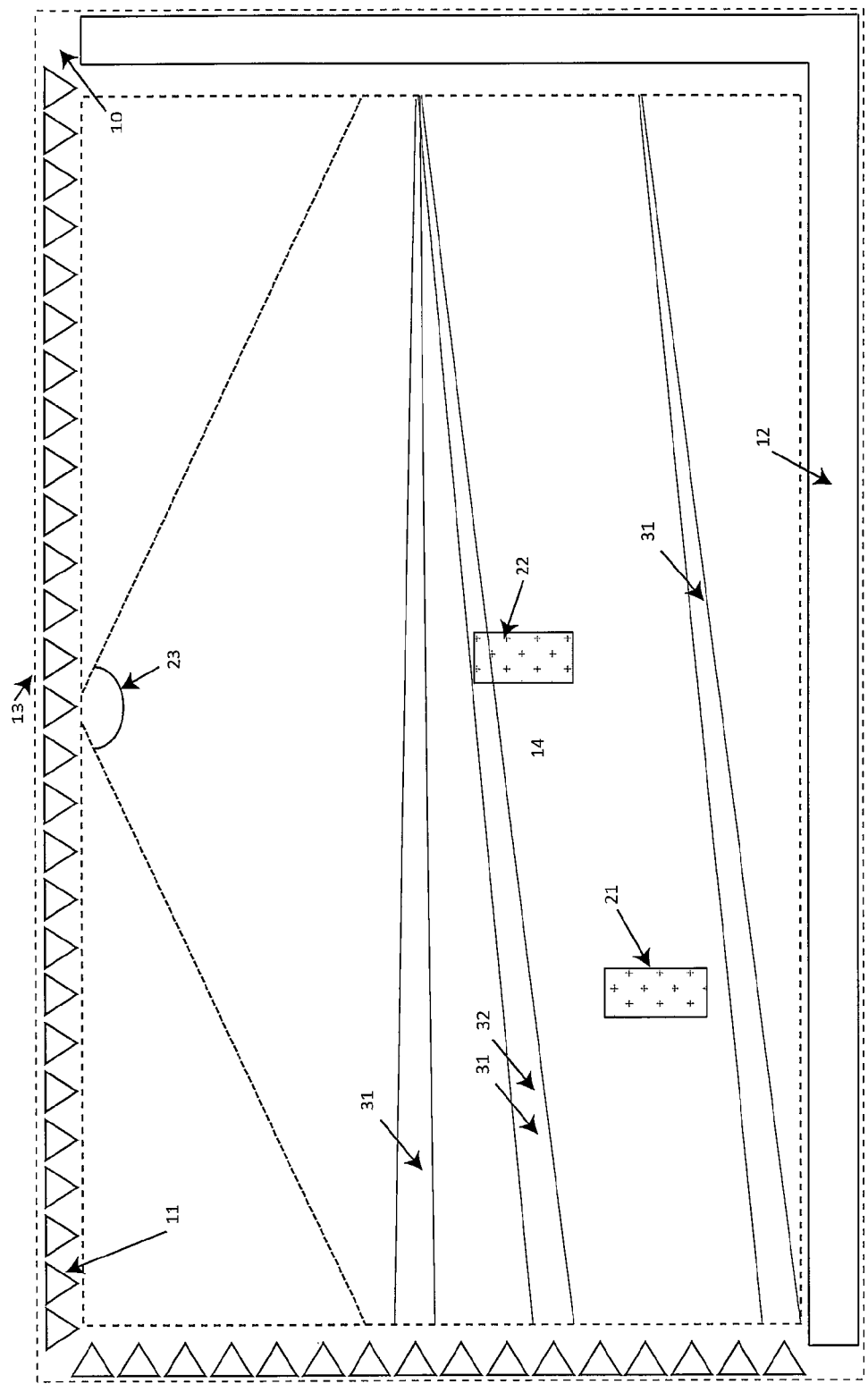
FIG. 2 shows a touch panel with a plurality of light transmitters and one light sensor and two touch objects on the touch surface.

FIG. 2 illustrates a second embodiment of a touch panel 13 in accord with the present invention, the touch panel in this case having a plurality of light transmitters 11 and one light sensor 12. Two touch objects 21, 22 are seen to be present within the touch region W 14. The light transmitters 11 can be a plurality of infrared LEDs. Each LED contains a semiconductor die and an optical lens. The optical lens is associated with a view angle 23 property that allows most infrared light energy to spread within the area defined by the view angle 23. The light sensor 12 is of L-shape and can be made of a customized contact image sensor unit.

The light path 31 is defined according to the size, location and optical structure of the light transmitter and light sensor. In the configuration illustrated in FIG. 2, each light path 31 can be defined as a triangle connecting between the infrared LED and the pixel located on the contact image sensor. For each light path, the sensor detects the light intensity. The light intensity can be normalized to the range between 0.0 and 1.0. A light intensity measured close to 0.0 indicates that the light is mostly interrupted by a touch object 21, 22 placed on the touch panel 13 and the light sensor can virtually detect no light signal. A light intensity measured close to 1.0 indicates that the light is passed through without any blockage. If the light path 31 is interrupted, a hot region 32 is defined on the light path 31.

Figure 3:
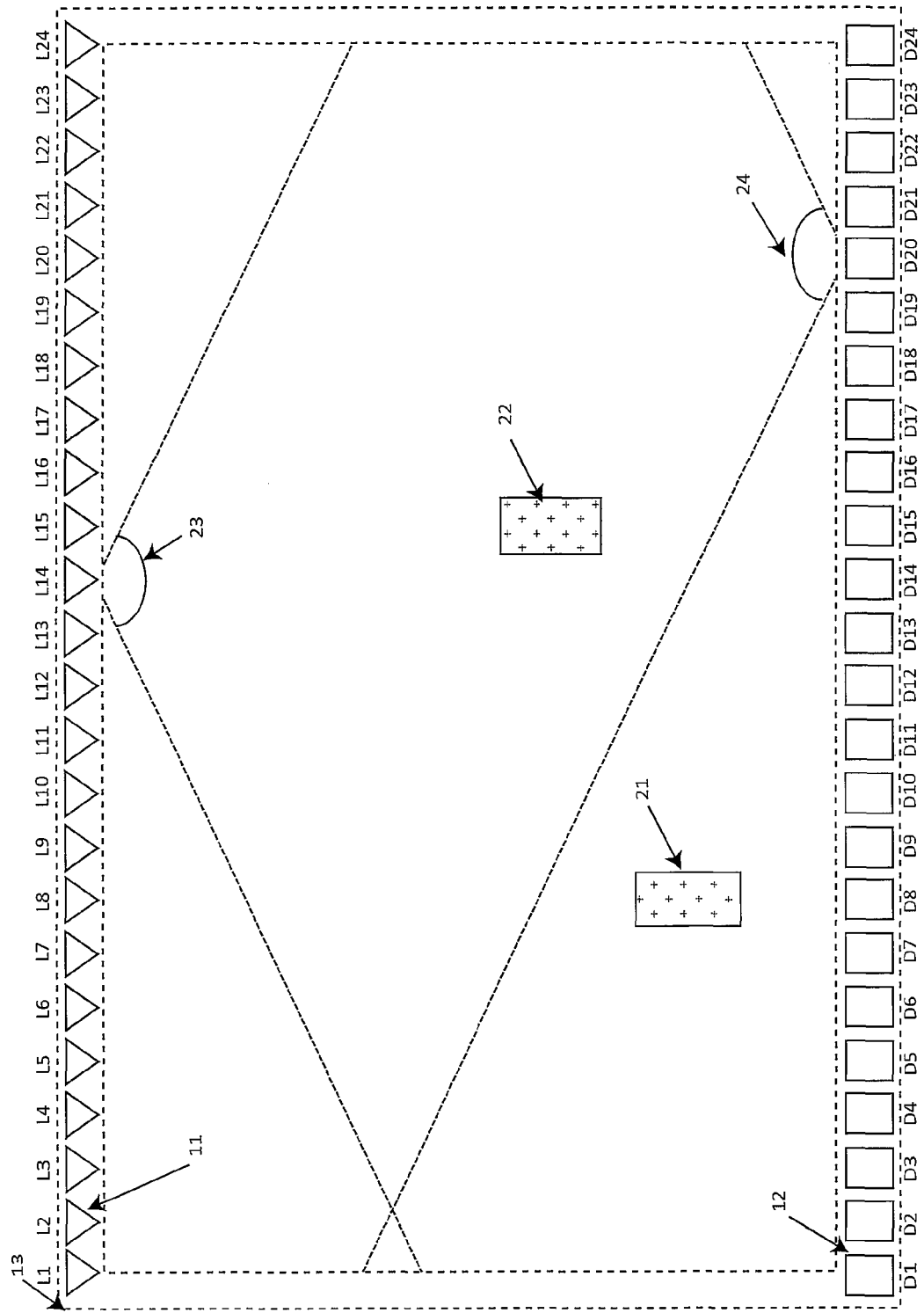
FIG. 3 shows a touch system with a plurality of light transmitters and a plurality of light sensors and two touch objects on the touch surface.

FIG. 3 illustrates a third embodiment of a touch panel 13 in accord with the present invention, the touch panel in this case having a plurality of light transmitters 11 on one side of the touch panel 13 and a plurality of light sensors 12 on the opposite side of the touch panel 13. The other two sides of the touch panel 13 are empty. This particular configuration is best for extremely long touch panel or touch wall applications, where the left and right side of the touch panel are so far apart (e.g. several meters long) that light energy detected on the left or right edge is very weak. This particular configuration is also best for low cost implementation of this invention because fewer components are required. In FIG. 3, there are two touch objects 21, 22 within the touch region W 14. The light transmitters 11 can be a plurality of infrared LEDs. The light sensors 12 can be a plurality of phototransistor sensors or photodiode sensors. Each of the light sensors can detect the light intensity measured at the sensor's position. The phototransistor sensor or photodiode sensor contains a semiconductor die and an optical lens. The optical lens is associated with a view angle 24 property that allows incoming infrared light energy within the view angle 24 to be detected by the light sensor.

Figure 4:
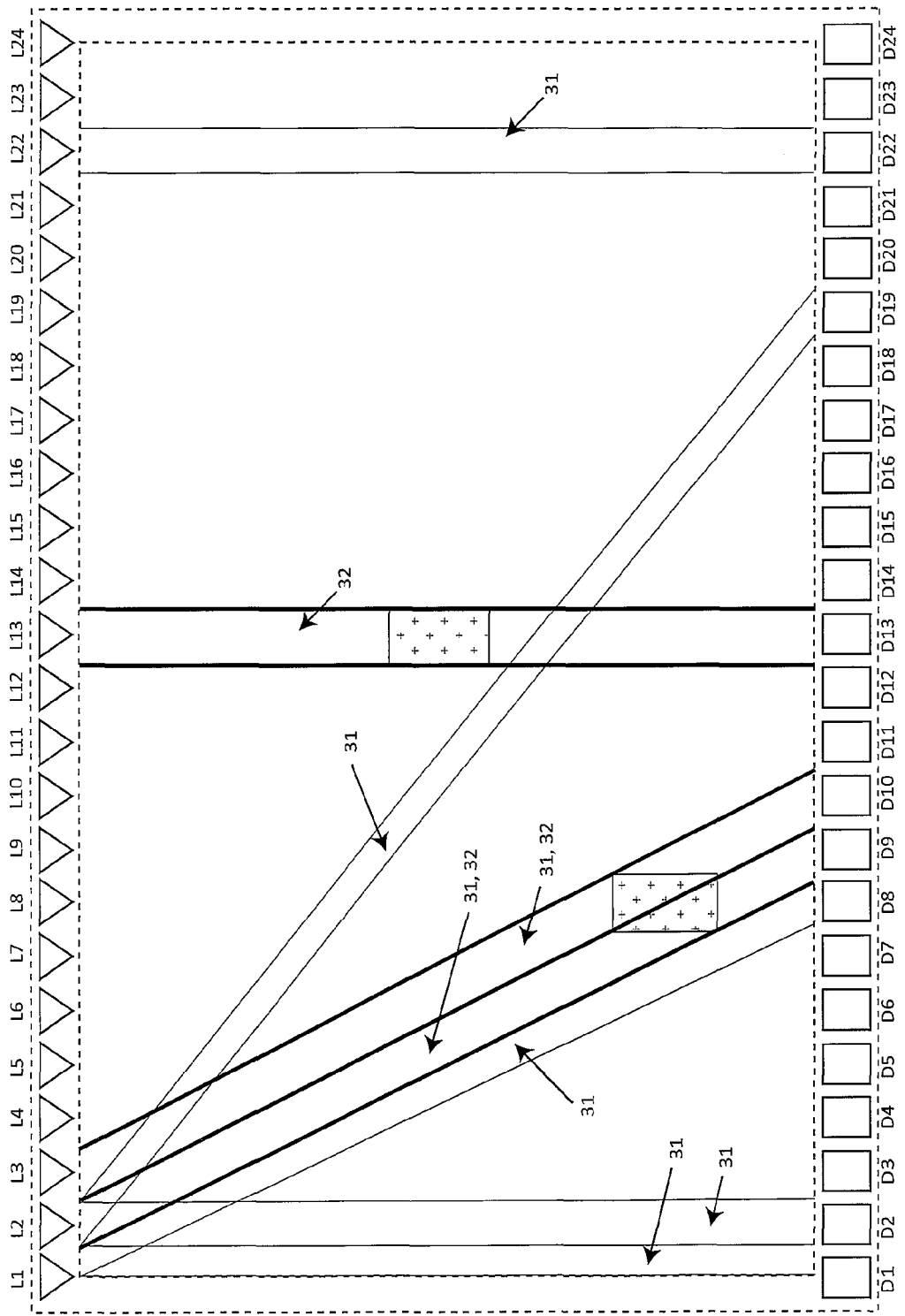
FIG. 4 shows light paths and hot regions.

FIG. 4 further illustrates the hot regions 32 and light paths 31 of this configuration. In a preferred embodiment, in order to simplify the physical lighting model, light paths can be defined by two parallel lines when the size of the LED and the size of the phototransistor/photodiode are the same.

For this invention, a method for detecting an id, position, size and convex contour of at least one object placed on a touch region W within a perimeter of a touch panel including on its periphery at least one light transmitter and at least one light sensor, said method comprises the following steps (a) acquiring light intensity data from a subset of light paths L between at least one light transmitter and at least one light sensor of the touch panel, at least one of the light paths being interrupted by placement of at least one touch object within the touch region W;

(b) computing hot regions H={$h_i$: i≤NH, where $h_i$ is the $i_{th}$ hot region} from a subset of said light intensity data by calculating the shape and boundary of interrupted light paths;

(c) computing expected object area S 55 by overlaying said hot regions H and comparing it with a predetermined overlay region P;

(d) deriving totally disconnected expected object area S' from S;

(e) computing spatial properties, including position, size and convex contour, of said totally disconnected expected object area S';

(f) associating touch objects with a subset of said totally disconnected expected object area S';

(g) assigning to each of said touch objects an ID and said spatial properties as a touch input vector representing the placement of each touch object on the touch panel.

The first step is to acquire light intensity data from a subset of light paths L. In a preferred embodiment; such subset of light paths can be predefined based on the view angles of the light transmitters and light sensors. For example, in FIG. 4, assuming the view angle of the light transmitter is 90 degree and the view angle of the light sensor is also 90 degree, the subset of light paths L could include light paths: L2-D2, L2-D3, . . . , L2-D19, but should not include L2-D20 because the light path of L2-D20 is out of the 90 degree view angle of L2 or D20. The light intensity of the light path L2-D20 detected by D20 is too weak and may not be accurate enough for further processing.

In a preferred embodiment of this invention where the touch accuracy is the first priority, it is best that the subset of light paths L contains all the light paths that are within the view angles of light transmitters and light sensors. For example, in FIG. 4, assuming the view angles of the light transmitters and light sensors are 90 degree, L, the subset of light paths, is best predefined as:

L = {
L1-D1, L1-D2, ... , L1-D18,
L2-D1, L2-D2, ... , L2-D19,
...
L23-D06, L23-D07, ... , L23-D24,
L24-D07, L24-D08, ... , L24-D24
}

In another preferred embodiment of this invention where the detection speed is the first priority, it is best that the subset of light paths L contains the least light paths that are sufficient for touch object detection. For example, the subset of light paths L can be dynamically reconfigured so that the locality properly of previous frames and future frames can be used to reduce the number of light paths needed to detect touch objects.

The first step of (a) acquiring a subset of light intensity data from said at least one light sensors further comprises the steps of:

(1) switching on each of said at least one light transmitters at least once for a calculated duration;

(2) reading electrical signals at least once from each light sensor of said subset of said at least one light sensors during the switch on time and/or before the switch on time.

Typically only one light transmitter is switched on at a time when multiple signals are read from different light sensors. The switch on duration depends on the response time of the light sensors. The response time of light sensors is dynamically affected by signal strength, ambient light, etc. For example, the response time is shorter in an environment with ambient light than in a dark room. Depending on different configurations, the switch on time can be configured to a constant value or be controlled by a processor in communication with the light transmitters and light sensors to adjust the duration dynamically.

Next, hot regions are computed from the light intensity data by calculating the shape and boundary of interrupted light paths. In a preferred embodiment of this invention where dynamic reconfiguring the subset of light paths L is expensive, hot regions can be computed from a subset of said light intensity data instead of reconfiguring the subset of light paths.

Figure 5:
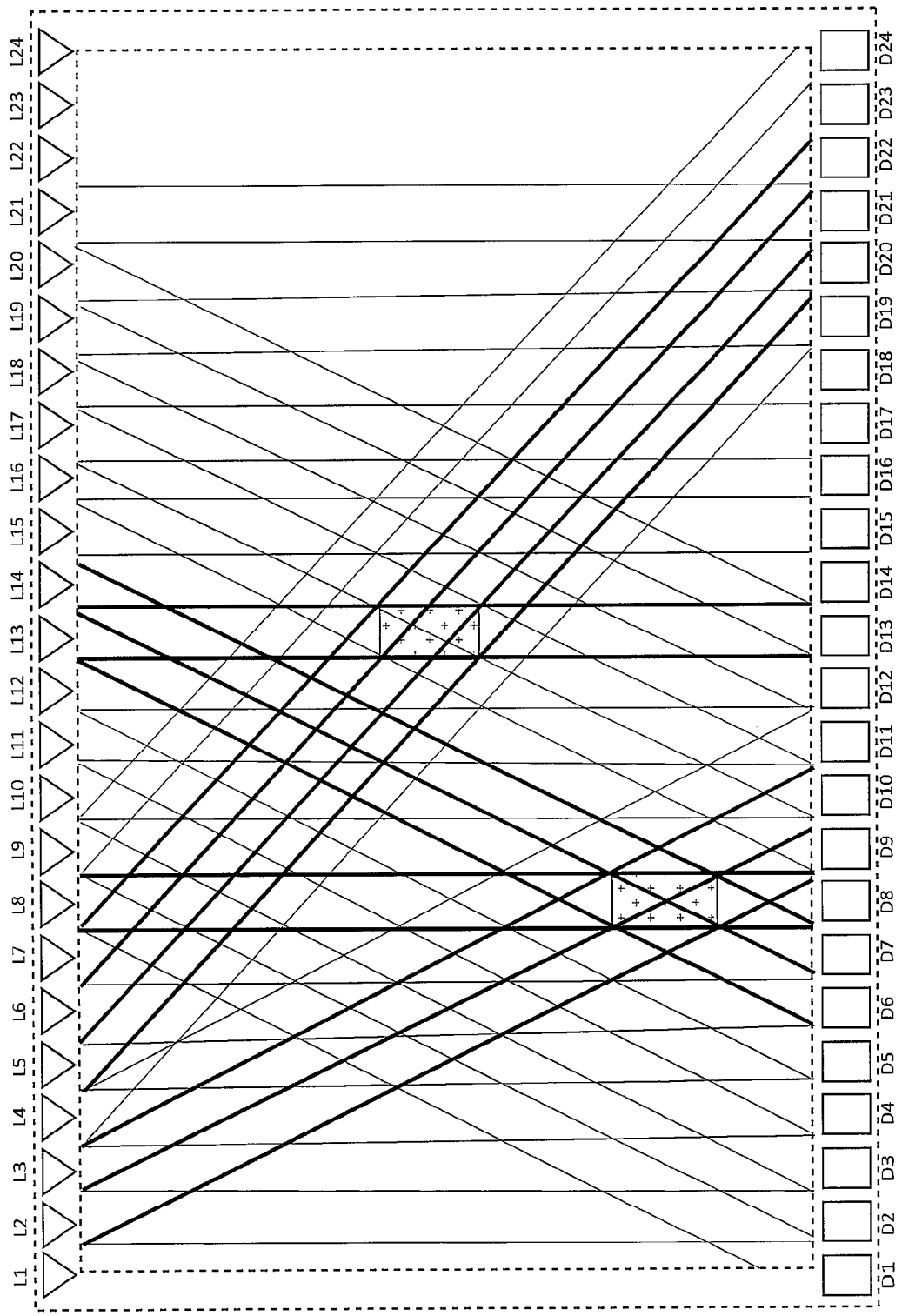
FIG. 5 shows a subset of light paths.

In order to illustrate the method used in this invention step by step as an example, a simplified subset of light paths L is chosen for illustration purpose. FIG. 5 shows the subset of light paths to be used in this particular example. The same subset of light paths L is used in FIG. 6 and FIG. 7. The subset of light paths L is predefined under this configuration as:

{L2-D2, L2-D9,
L3-D3, L3-D10,
L4-D4, L4-11, L4-D19,
L5-D5, L5-D20,
L6-D6, L6-D21,
L7-D7, L7-D22,
L8-D1, L8-D8, L8-D23,
L9-D1, L9-D9, L9-D24,
L10-D3, L10-D10,
L11-D11, L11-D4,
L12-D12, L12-D5,
L13-D13, L13-D6,
L14-D14, L14-D7,
L15-D15, L15-D8,

```
L16-D16, L16-D9,
L17-D17, L17-D10,
L18-D18, L18-D11,
L19-D19, L19-D12,
L20-D20, L20-D13,
L21-D21,
}
```

Figure 6:
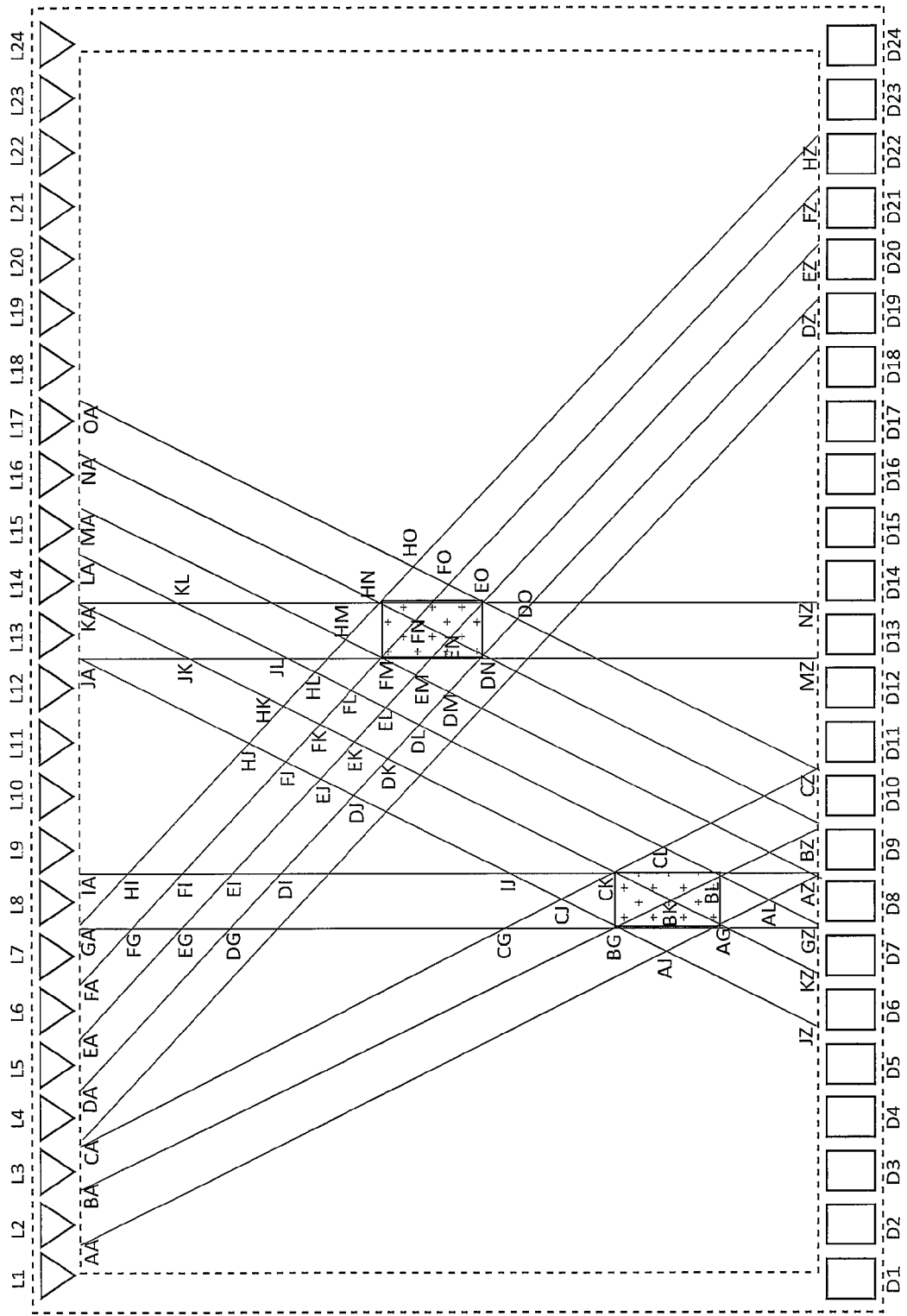
FIG. 6, 7 show overlaying hot regions.

FIG. 6 shows overlaying hot regions, where the interrupted light paths define the hot regions. We use a list of vertexes to label each region. The alphanumerical labels are arbitrary defined for illustration purpose.

Figure 10:
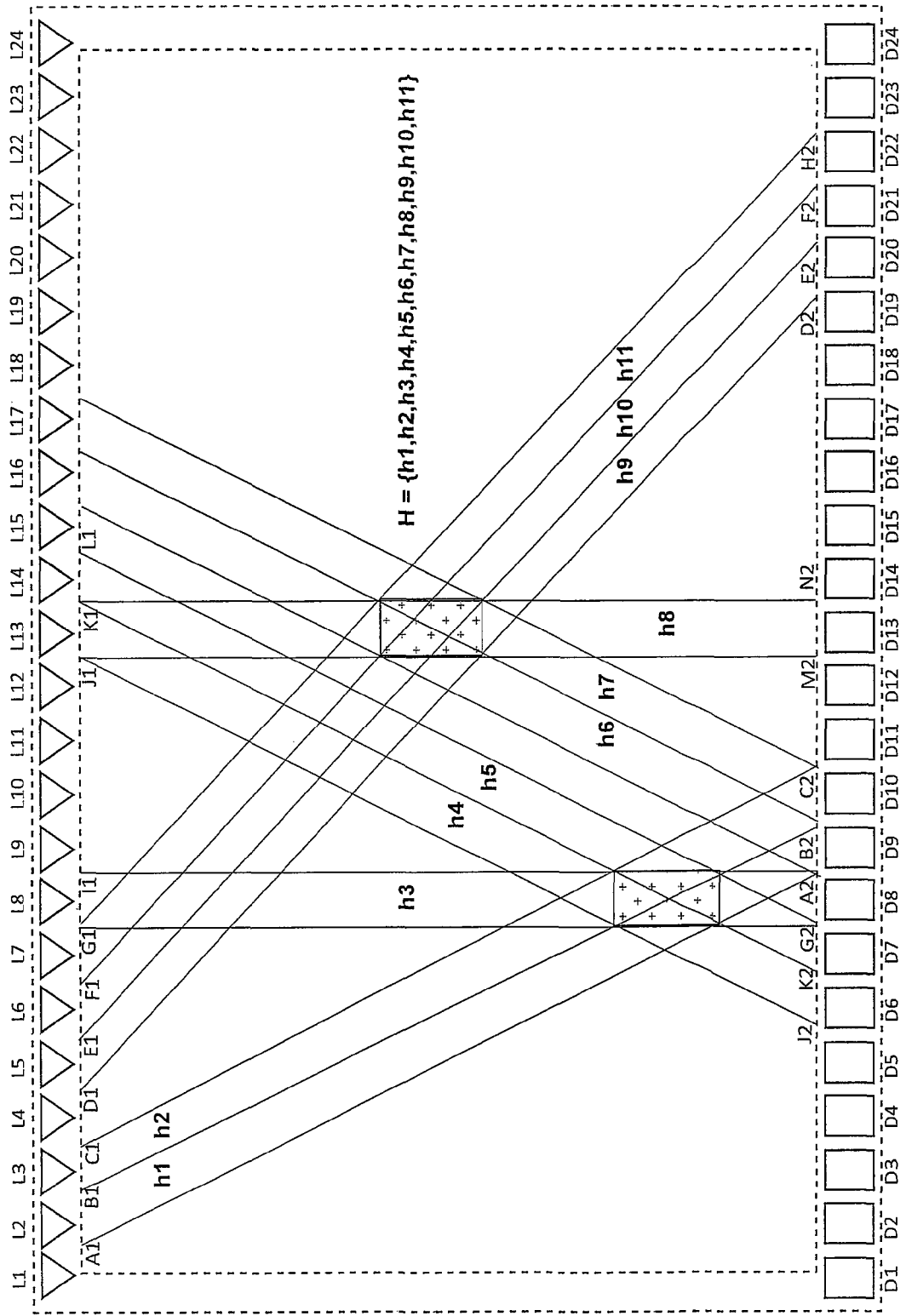
FIG. 10 shows H, a set of hot regions, comprising hot region h1, h2, h3, h4, h5, h6, h7, h8, h9, h10, h11.

In FIG. 10, H, a set of hot regions contains 11 hot regions: H={$h_1$, $h_2$, $h_3$, $h_4$, $h_5$, $h_6$, $h_7$, $h_8$, $h_9$, $h_{10}$, $h_{11}$}. For example, vertices of A1, B1, B2 and A2 define the first hot region $h_1$. For illustration purpose, we define:

$h_1$ = AA_BA_BZ_AZ;

$h_2$ = BA_CA_CZ_BZ;

$h_3$ = GA_IA_AZ_GZ;

$h_4$ = JA_KA_KZ_JZ;

$h_5$ = KA_LA_GZ_KZ;

$h_6$ = MA_NA_BZ_AZ;

$h_7$ = NA_OA_CZ_BZ;

$h_8$ = DA_EA_EZ_DZ;

$h_9$ = EA_FA_FZ_EZ;

$h_{10}$ = JA_KA_NZ_MZ;

$h_{11}$ = FA_GA_HZ_FZ;

Now we have hot regions H computed.

Figure 11:
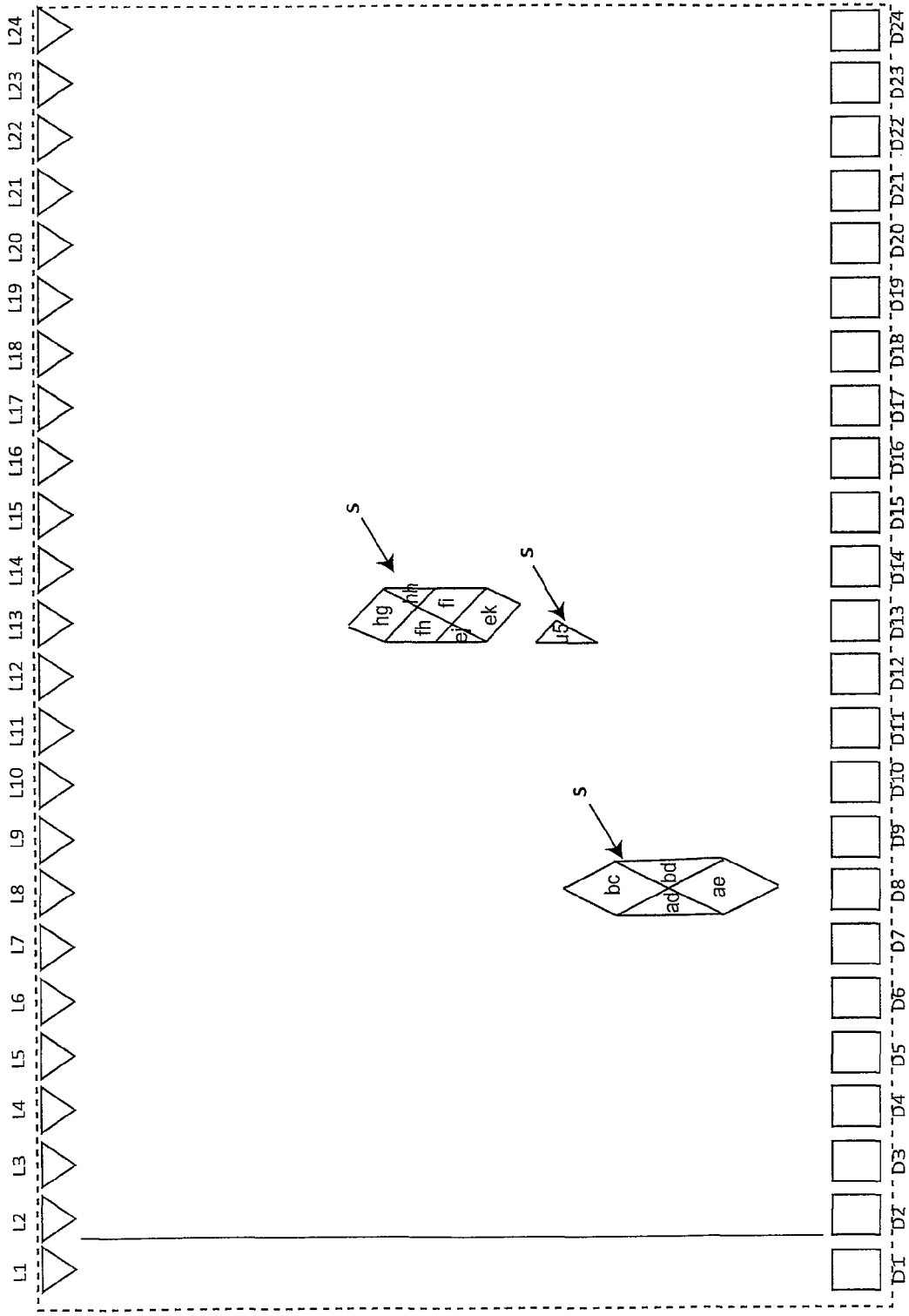
FIG. 11 shows S, expected object area.

Next, step (c) is to compute expected object area S by overlaying said hot regions H and comparing it with a predetermined overlay region P. FIG. 11 shows three object areas S. We list two preferred embodiments, where the step (c) is processed differently.

For the first preferred embodiment, overlay region $R_i$ is calculated as:

$$R_i = \begin{cases} \left\{ \left\langle \left(F \cap h_i - \bigcup_{k=1}^{NR_{i-1}} x_k\right), 1 \right\rangle \right\} \cup \bigcup_{k=1}^{NR_{i-1}} \{\langle (x_k \cap h_i), c_k + 1 \rangle\} \cup \{\langle x_k - h_i, c_k \rangle\}, & \text{if } i > 1, \\ \text{where } R_{i-1} = \{\langle x_1, c_1 \rangle, \ldots, \langle x_{NR_{i-1}}, c_{NR_{i-1}} \rangle\} \\ \{\langle (F \cap h_i), 1 \rangle\}, & \text{if } i = 1 \end{cases}$$

where $F$ is a filter region

Overlay regions $R_i$ is the data structure representing $1^{st}$, ..., $i_{th}$ hot regions overlaid all together. Overlay regions R1 through R11 are illustrated in separate FIGS. 16 through 26.

Figure 28:
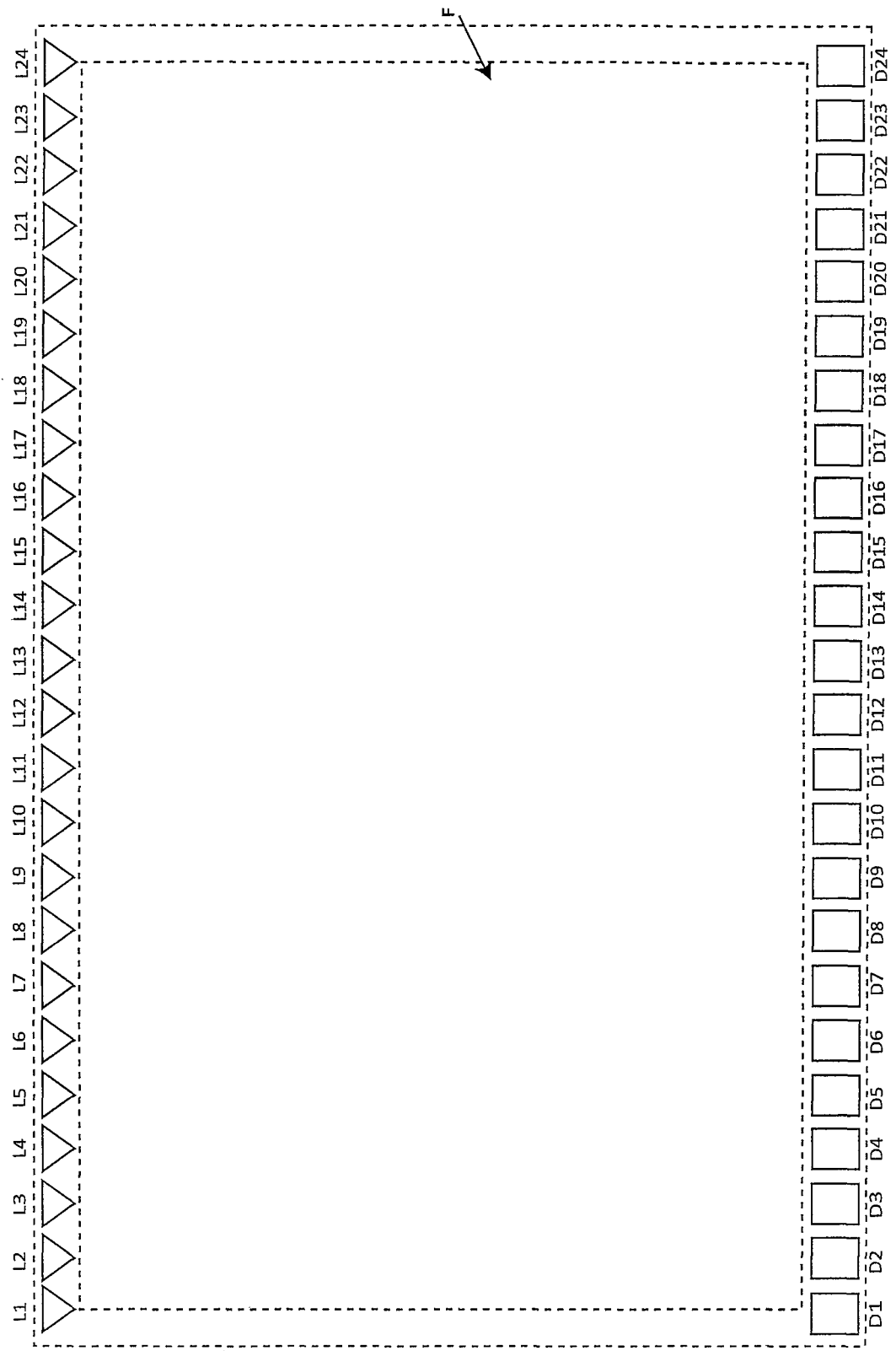
FIG. 28 shows F, a filter region.
Figure 29:
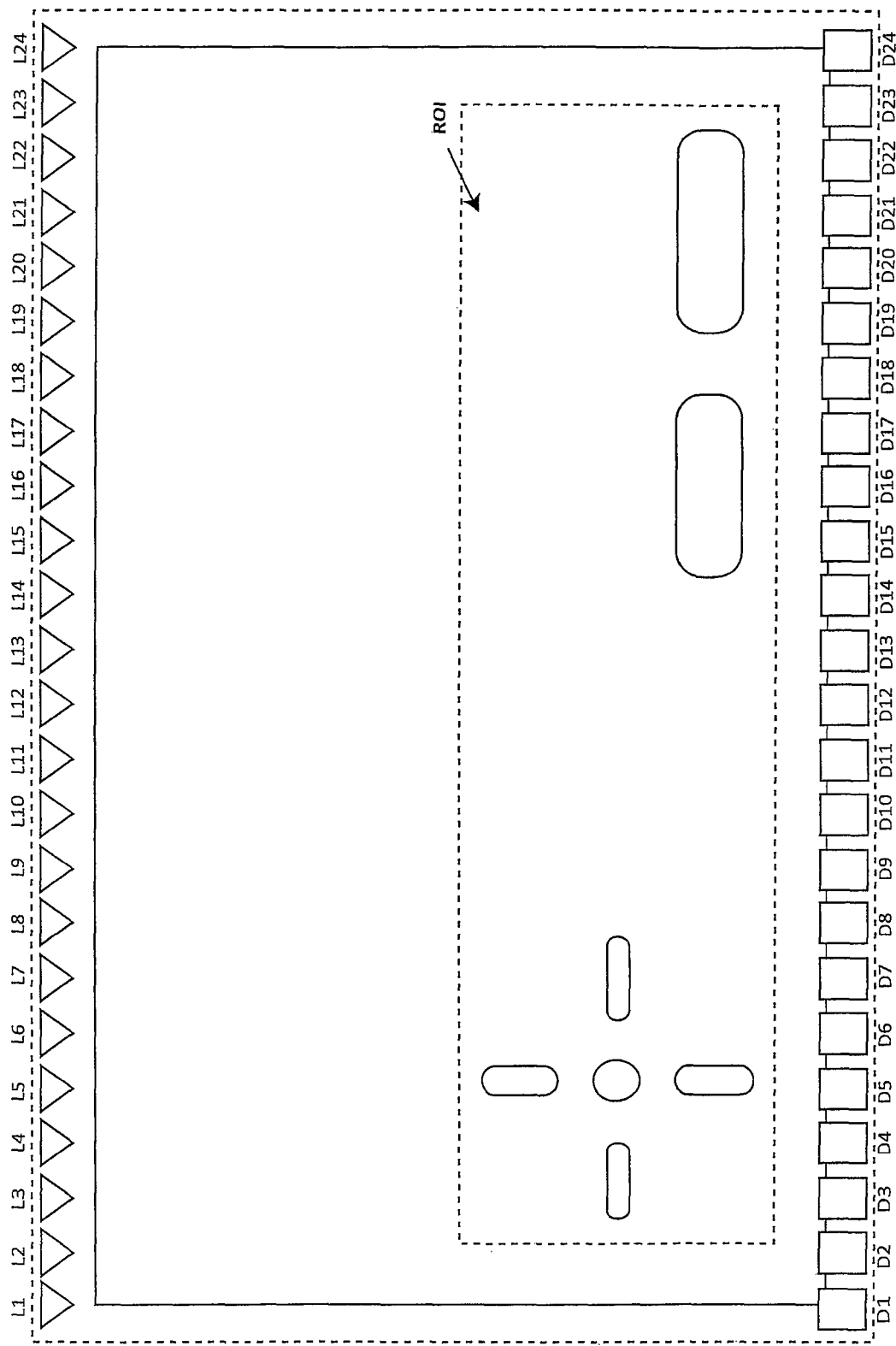
FIG. 29 shows ROI, region of interest.

For this example, filter region F is set to be the whole touch region W, as shown in FIG. 28. In other implementations, the filter region can be the region of interest ROI defined by the user, as shown in FIG. 29, or can be $\cup_{i=1}^{NH'}\{h'_i\}$, (where H'={$h'_1$, ... $h'_{NH'}$} and H' is a subset of H) so that the overlay regions can be restricted to a smaller or focused area.

For example in FIG. 6, overlay regions $R_1$, ..., $R_9$ are calculated as following:
$R_0$ is initialized to be { }

To overlay hot region $h_1$ (AA_BA_BZ_AZ) on $R_0$:
$R_1$={<AA_BA_BZ_AZ,1>}
To overlay hot region $h_2$ (BA_CA_CZ_BZ) on $R_1$:
$R_2$={<AA_BA_BZ_AZ,1>, <BA_CA_CZ_BZ,1>}
Please note, $R_2$: {<AA_BA_BZ_AZ,1>, <BA_CA_CZ_BZ, 1>} is also considered equivalent to {<AA_CA_CZ_AZ,1>}, which describe the same overlay regions in one big piece instead of two smaller pieces. In short, overlay regions <x1, c> together with <x2, c> is considered equivalent to an overlay region <x1+x2, c>.
To overlay hot region $h_3$ (GA_IA_AZ_GZ) on $R_2$
$R_3$={<GA_IA_CK_CG+AG_AZ_GZ,1>,
<BG_BL_AZ_AG,2>, <AA_BA_BG_AG+BL_BZ_AZ, 1>, <CG_CK_BL_BG,2>, <BA_CA_CG_BG+CK_CZ_AZ,1>}
To overlay hot region $h_4$ (JA_KA_KZ_JZ) on $R_3$
$R_4$={<JA_KA_CK_IJ+AJ_AG_GZ_JZ,1>, <CJ_IJ_CK,2>, <GA_IA_IJ_CJ_CG+AG_AZ_GZ,1>, <_BK_AG,3>, <BK_BL_AZ_AG,2>, <AJ_BG_AG,2>, <AA_BA_BG_AJ+BL_BZ_AZ,1>, <CJ_CK_BK_BG,3>, <CG_CJ_BG+BK_CK_BL,2>, <φ, 1>, <BA_CA_CG_BG+CK_CZ_AZ,1>}
...
To overlay hot region $h_{11}$ (FA_GA_HZ_FZ) on $R_9$ $R_{11}$ = {⟨BG_CJ_CK, 3⟩, ⟨BG_BK_AG, 3⟩, ⟨BG_CK_BK, 3⟩,

⟨BK_CK_BL, 3⟩, ⟨AG_BK_BL, 3⟩, ⟨AG_BL_AL, 3⟩,

⟨CG_CJ_BG, 2⟩, ⟨CJ_IJ_CK, 2⟩, ⟨AJ_BG_AG, 2⟩, ⟨CK_CL_BL, 2⟩,

⟨AG_AL_G2, 2⟩, ⟨AL_BL_A2, 2⟩, ⟨G1_HI_FI_FG, 2⟩,

⟨FG_FI_EI_EG, 2⟩, ⟨EG_EI_DI_DG, 2⟩, ⟨HJ_HK_FK_FJ, 2⟩,

⟨HK_HL_FL_FK, 2⟩, ⟨FJ_FK_EK_EJ, 2⟩, ⟨FK_FL_EL_EK, 2⟩,

⟨EJ_EK_DK_DJ, 2⟩, ⟨EK_EL_DL_DK, 2⟩, ⟨HM_HN_FN_FM, 2⟩,

⟨FM_FN_EN_EM, 2⟩, ⟨EM_EN_DN_DM, 2⟩, ...}

The final overlay region R of all hot regions: R=R11.

Regions (e.g. $h_i$) and overlay regions (e.g. $R_i$) can be stored in a processor's memory or computer's main memory or graphics card memory using vector and/or raster and/or 3D z-order data structures. The use of vector format to represent regions and overlay regions allows high precision, consumes less memory and fast geometry calculation. The use of raster or 3D z-order formats can also be used in graphics card acceleration. The uses of different data structures to represent the same regions and overlay regions are considered to be equivalent between each other.

Figure 7:
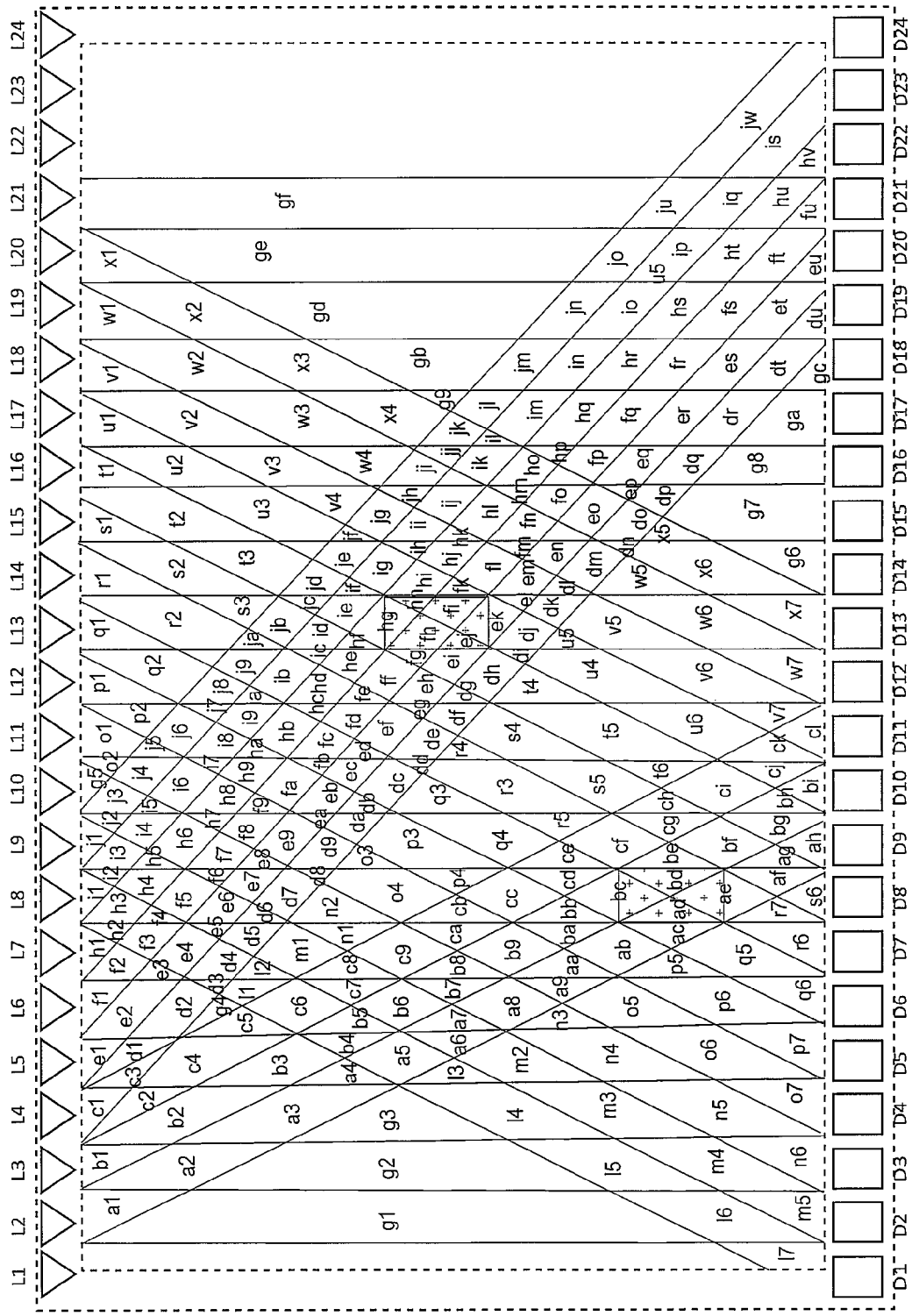
Figure 14:
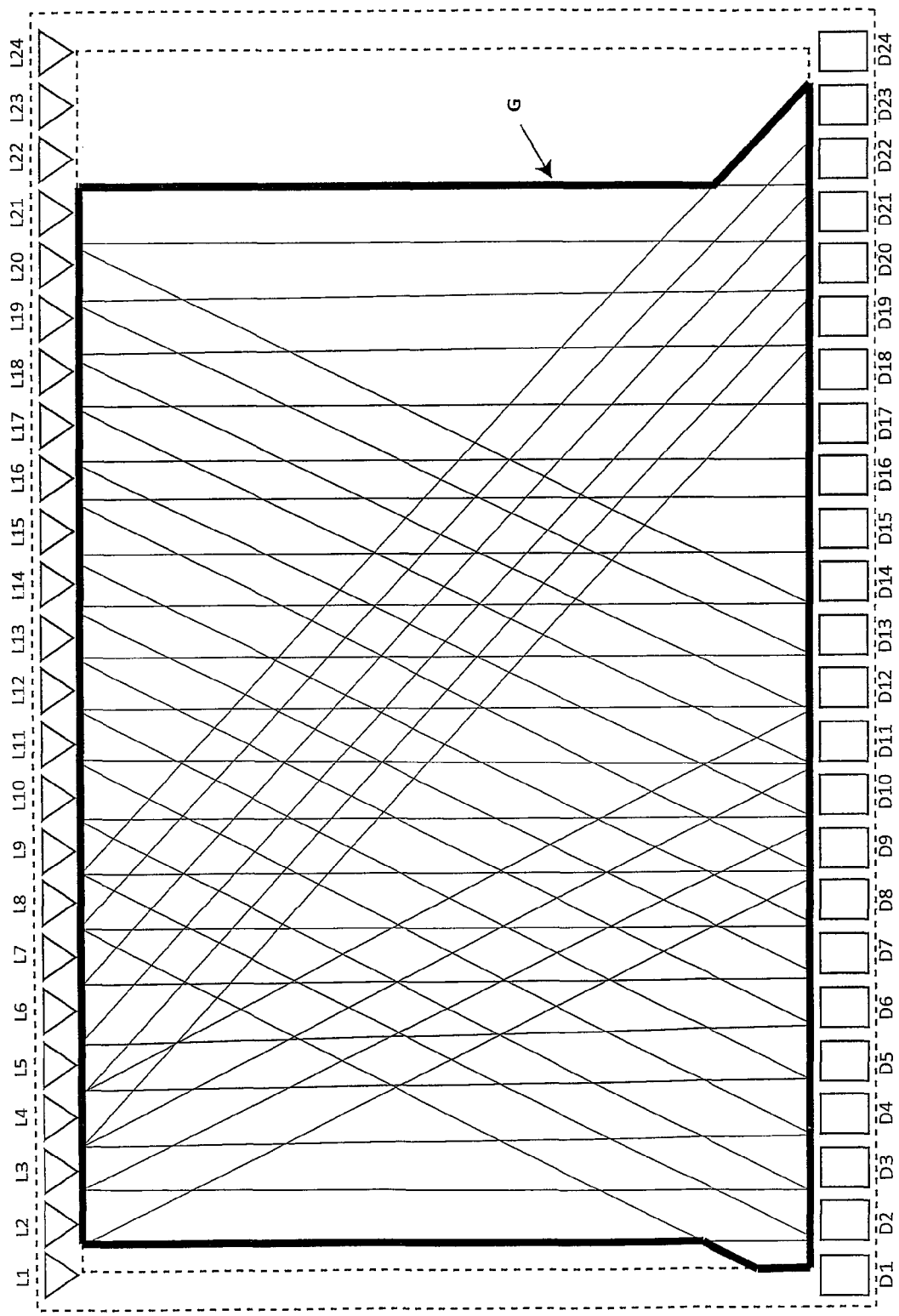
FIG. 14 shows G, a set of hot regions pre-calculated from said subset of light intensity data wherein the light intensity values are filled with zeros or a value below a predefined threshold.

FIG. 7 shows the calculation of a predetermined overlay region Q. Once the subset of light paths L is defined (shown in FIG. 5), set Q=$Q_{NG}$, where $Q_{NG}$ is recursively defined as:

$$Q_i = \begin{cases} \left\{\left\{\left(g_i - \bigcup_{k=1}^{NQ_{i-1}} x_k\right), 1\right\}\right\} \cup \bigcup_{k=1}^{NQ_{i-1}} \{\langle(x_k \cap g_i), c_k + 1\rangle\} & \text{if } i > 1, \\ \bigcup \{\langle x_k - g_i, c_k\rangle\}, & \\ & \text{and } Q_{i-1} = \{\langle x_1, c_1\rangle, \ldots, \langle x_{NQ_{i-1}}, c_{NQ_{i-1}}\rangle\} \\ & \text{and } G = \{g_1, \ldots, g_{NG}\} \\ \{\langle g_1, 1\rangle\}, & \text{if } i = 1 \end{cases}$$

where G is a set of hot regions pre-calculated from said subset of light intensity data wherein the light intensity values are filled with zeros or a value below a predefined threshold. Pre-calculated hot regions G are outlined in FIG. 14.

In one preferred embodiment (such as this example), G=L, which means all the light paths are hot regions. As shown in FIG. 7, Q can be pre-calculated as below:

$$Q = \{\langle a1, 2\rangle, \langle a2, 2\rangle, \langle a3, 2\rangle, \langle a4, 2\rangle, \langle a5, 3\rangle,$$
$$\langle a6, 3\rangle, \langle a7, 3\rangle, \langle a8, 3\rangle, \langle a9, 3\rangle, \langle aa, 3\rangle, \langle ab, 3\rangle,$$
$$\langle ac, 3\rangle, \langle ad, 3\rangle, \langle ae, 3\rangle, \langle af, 3\rangle, \langle ag, 3\rangle, \langle ah, 3\rangle, \ldots\}$$

Figure 15:
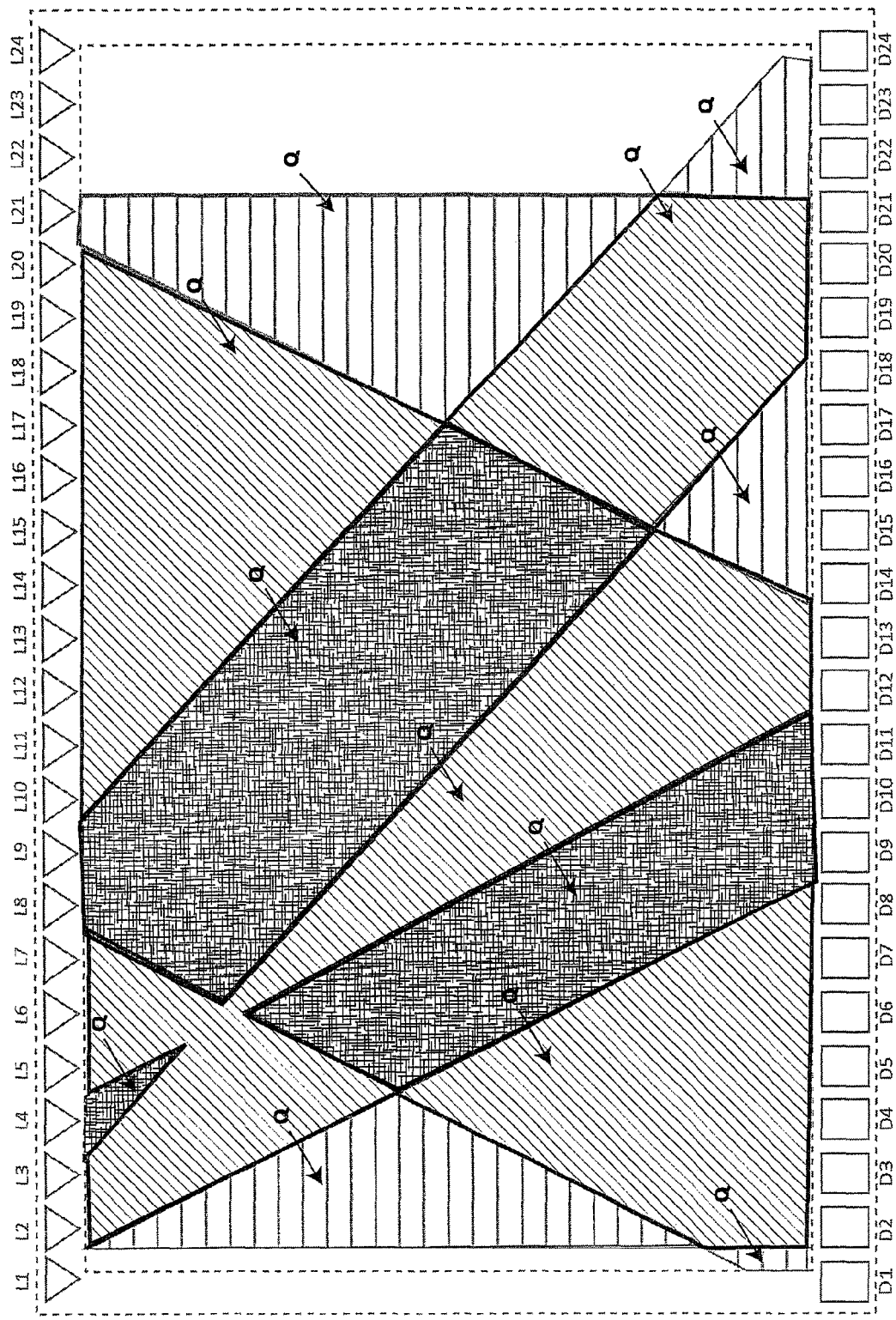
FIG. 15 shows Q, a predetermined overlay region.
Figure 16:
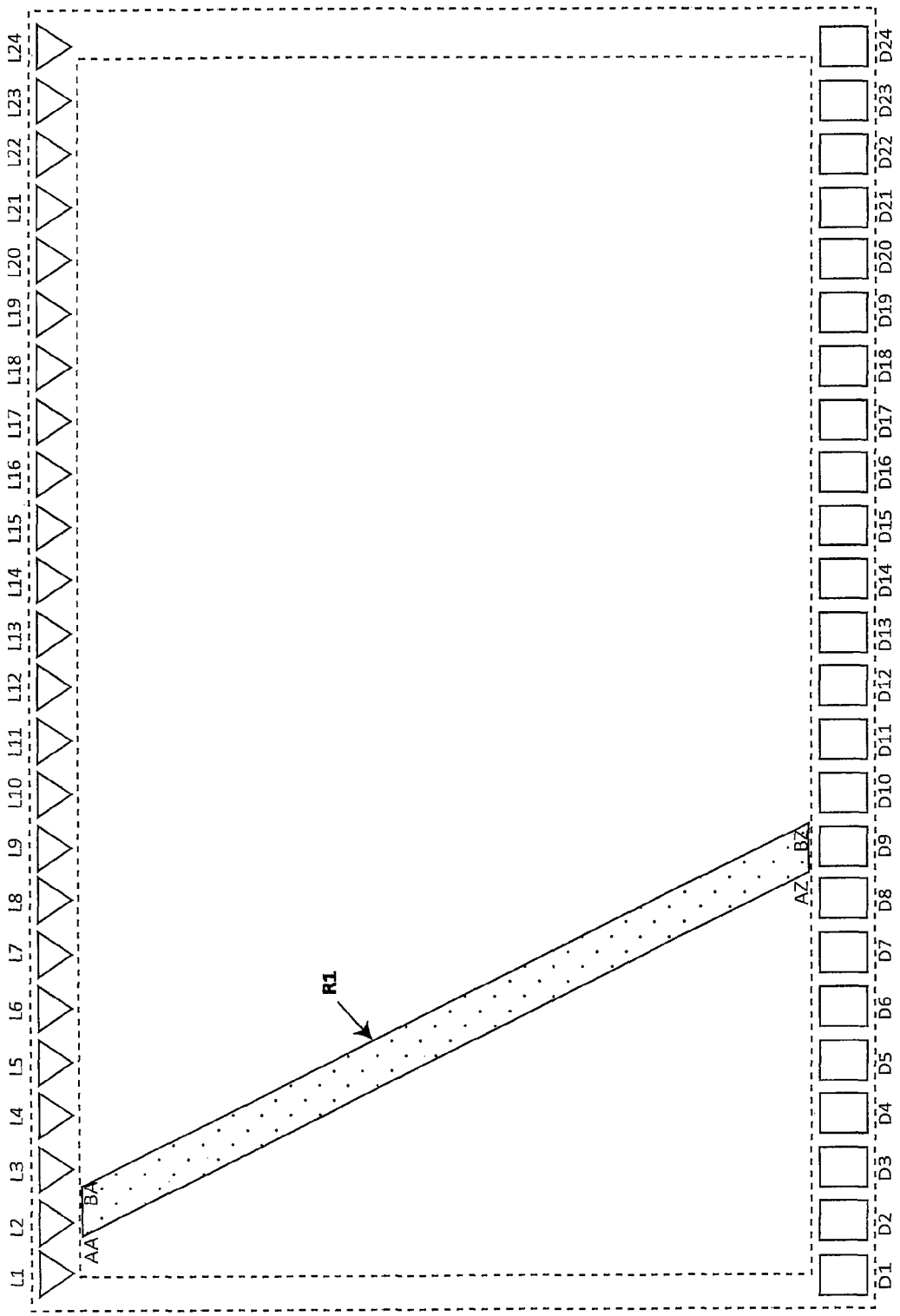
FIG. 16 shows R1, a set of overlay regions.
Figure 17:
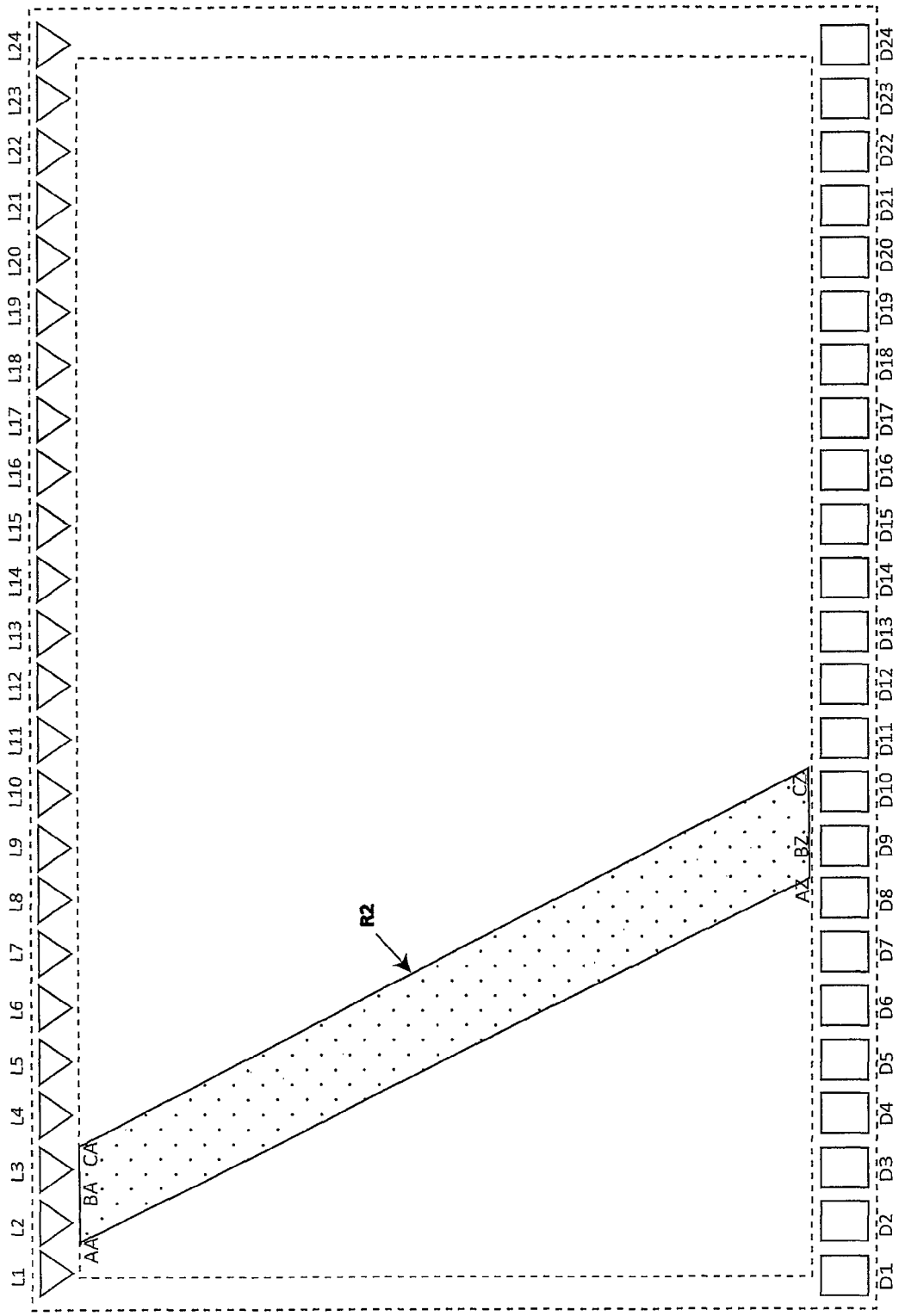
FIG. 17 shows R2, a set of overlay regions.
Figure 18:
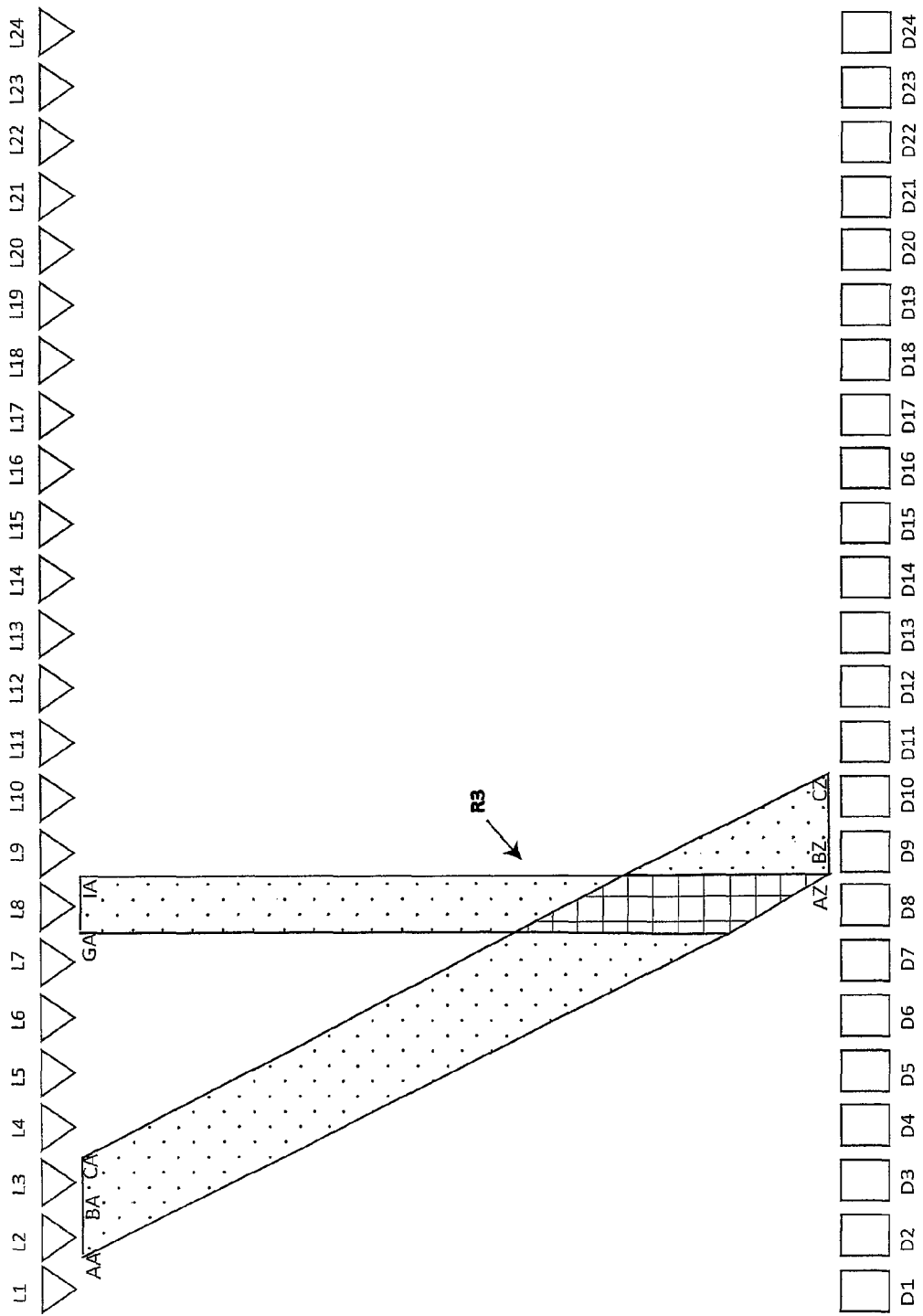
FIG. 18 shows R3, a set of overlay regions.
Figure 19:
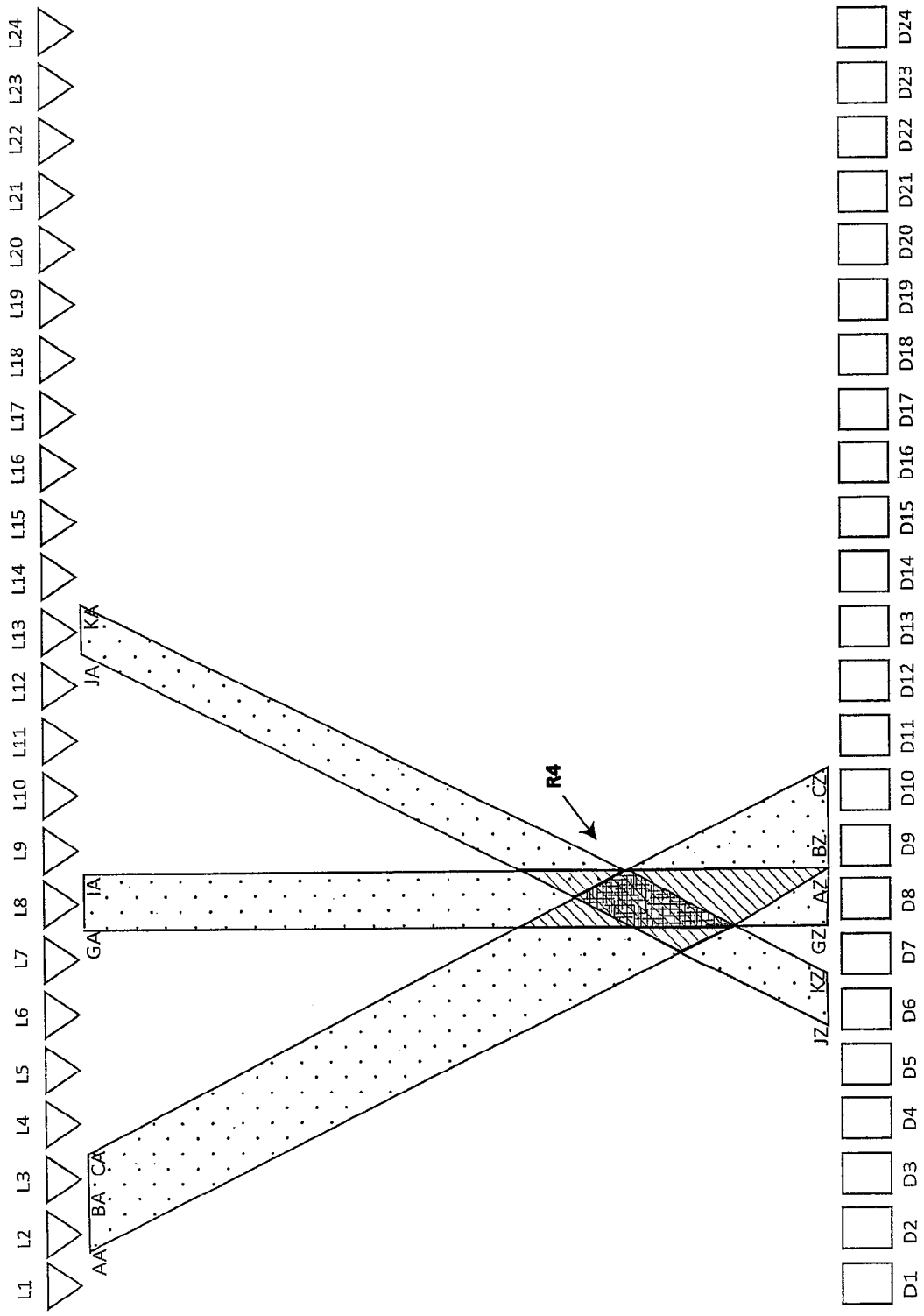
FIG. 19 shows R4, a set of overlay regions.
Figure 20:
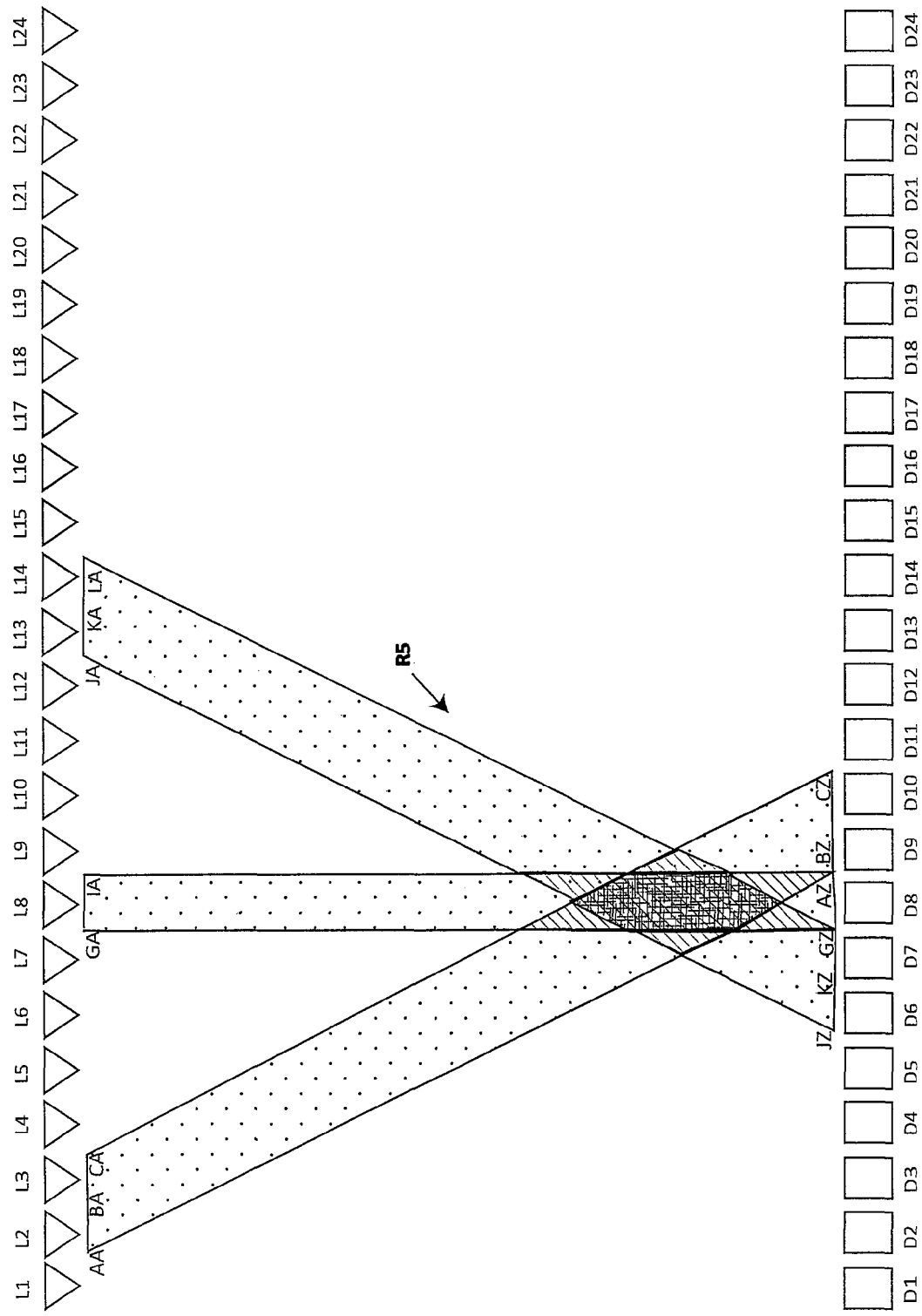
FIG. 20 shows R5, a set of overlay regions.
Figure 21:
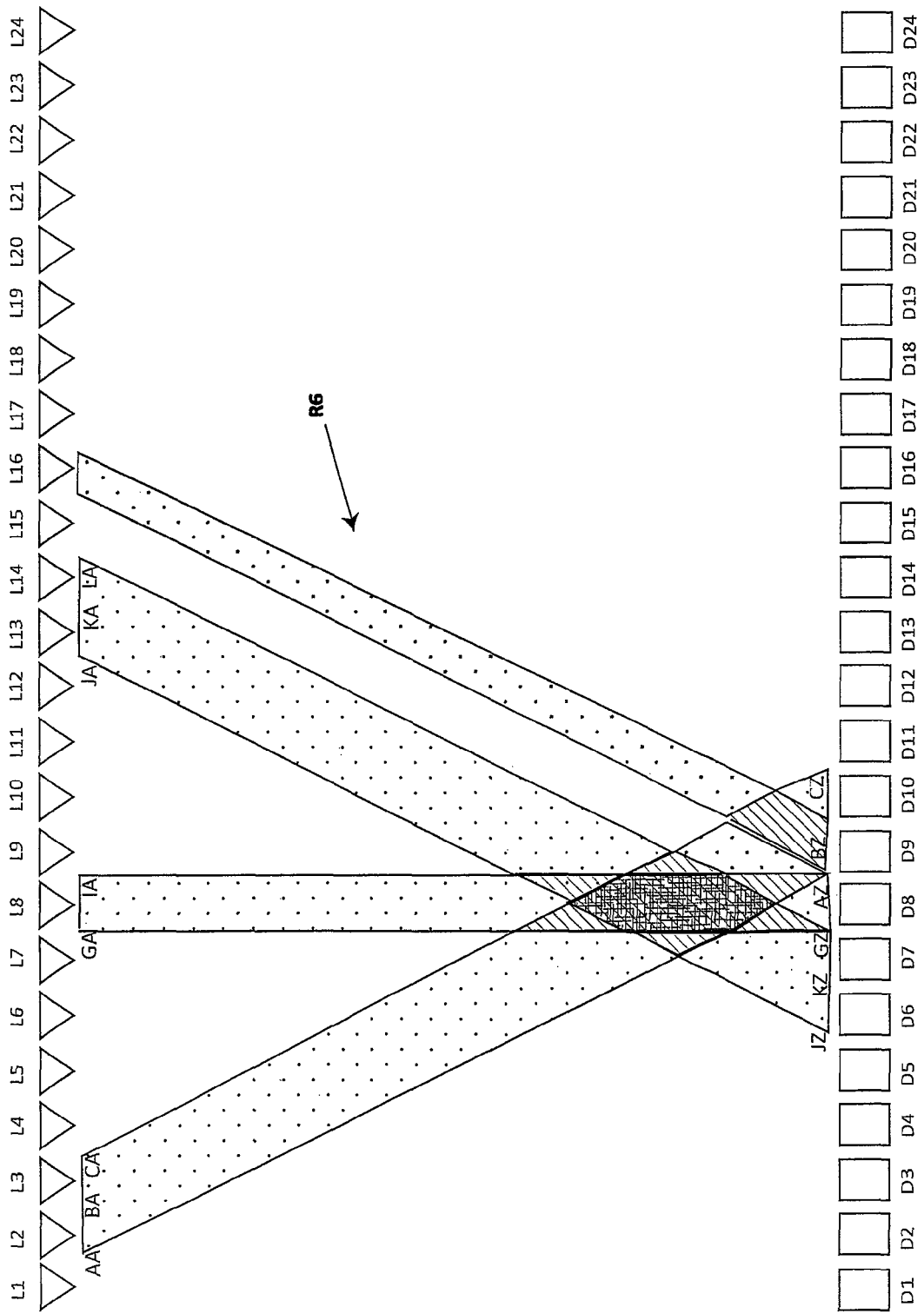
FIG. 21 shows R6, a set of overlay regions.
Figure 22:
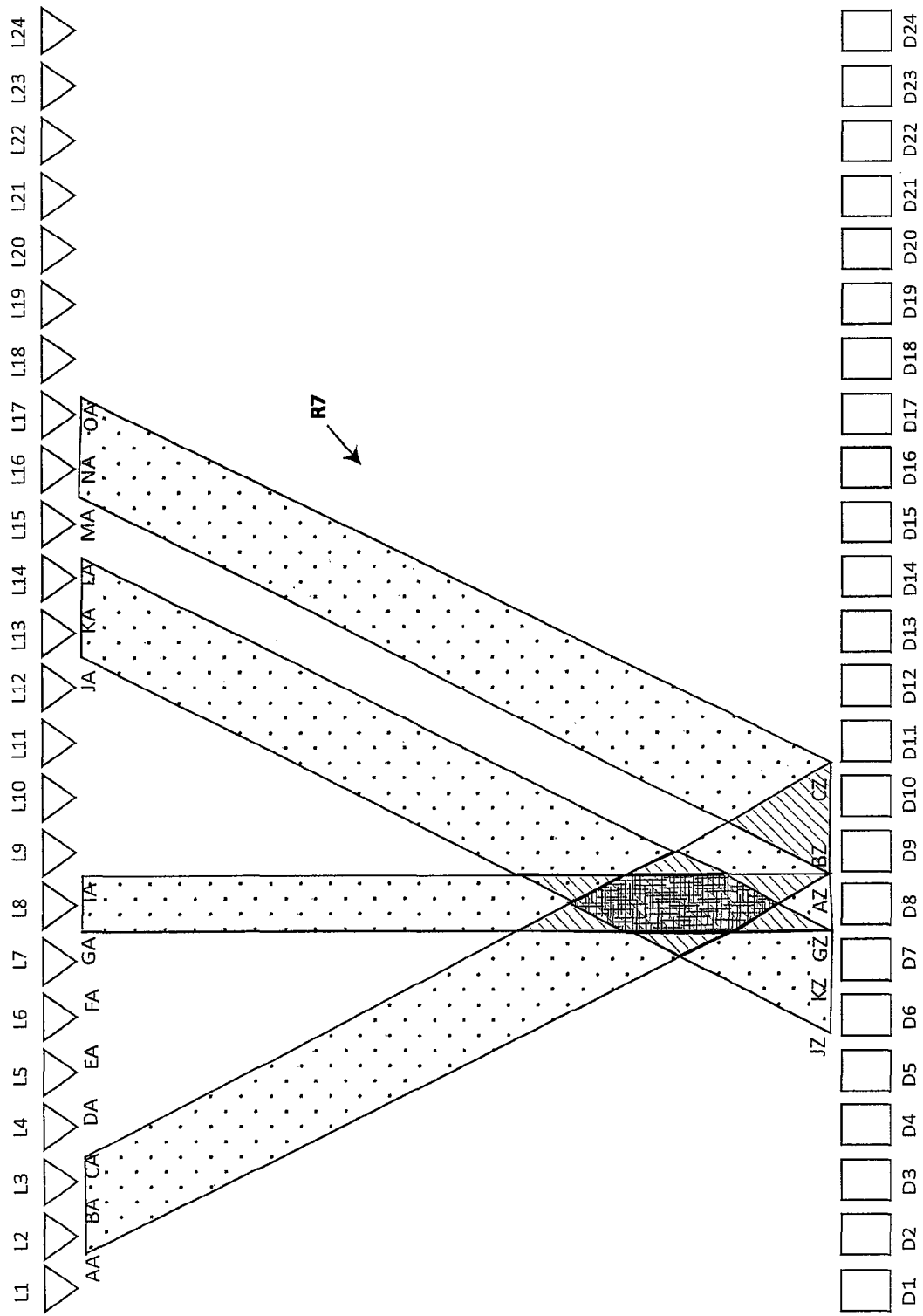
FIG. 22 shows R7, a set of overlay regions.
Figure 23:
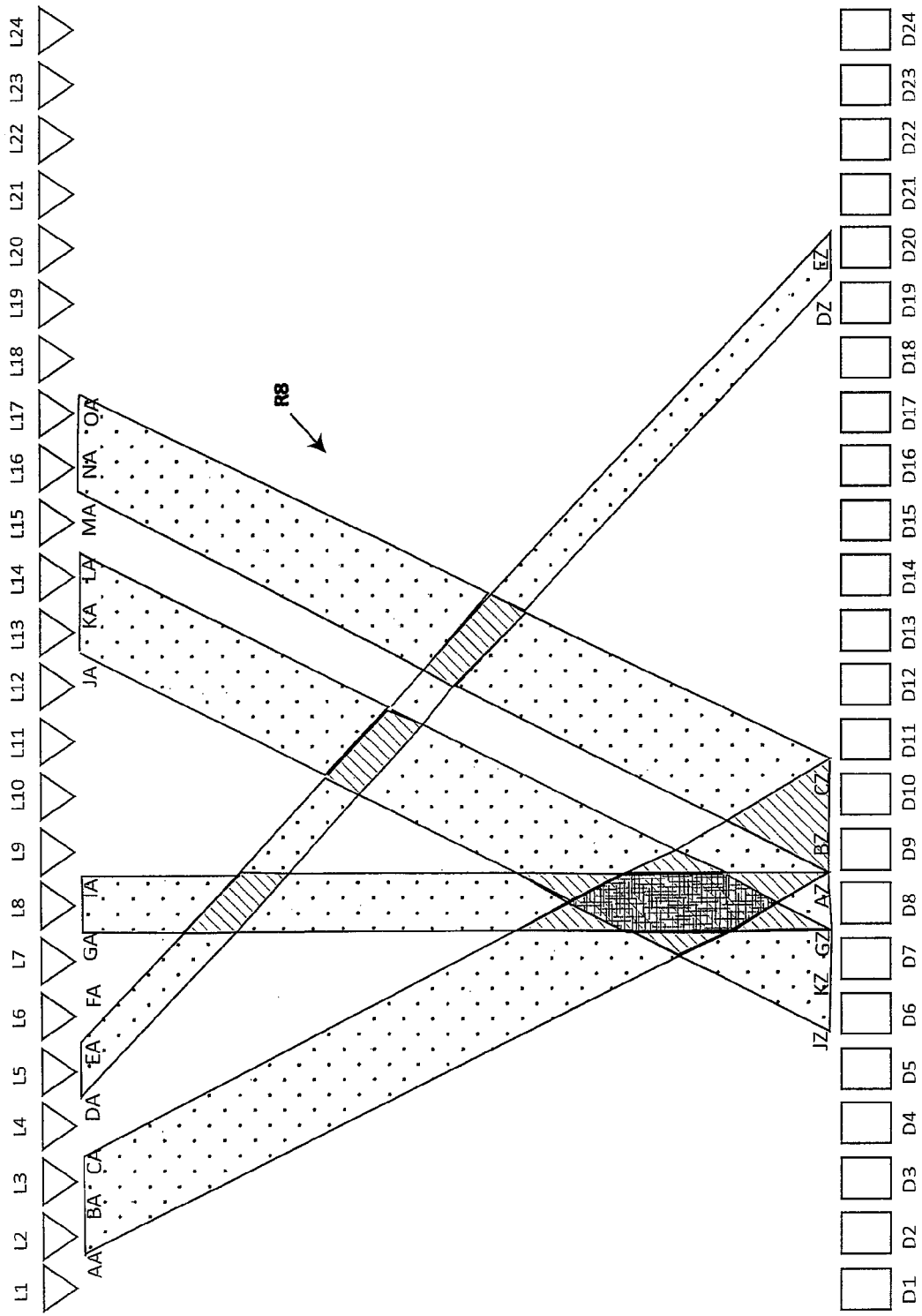
FIG. 23 shows R8, a set of overlay regions.
Figure 24:
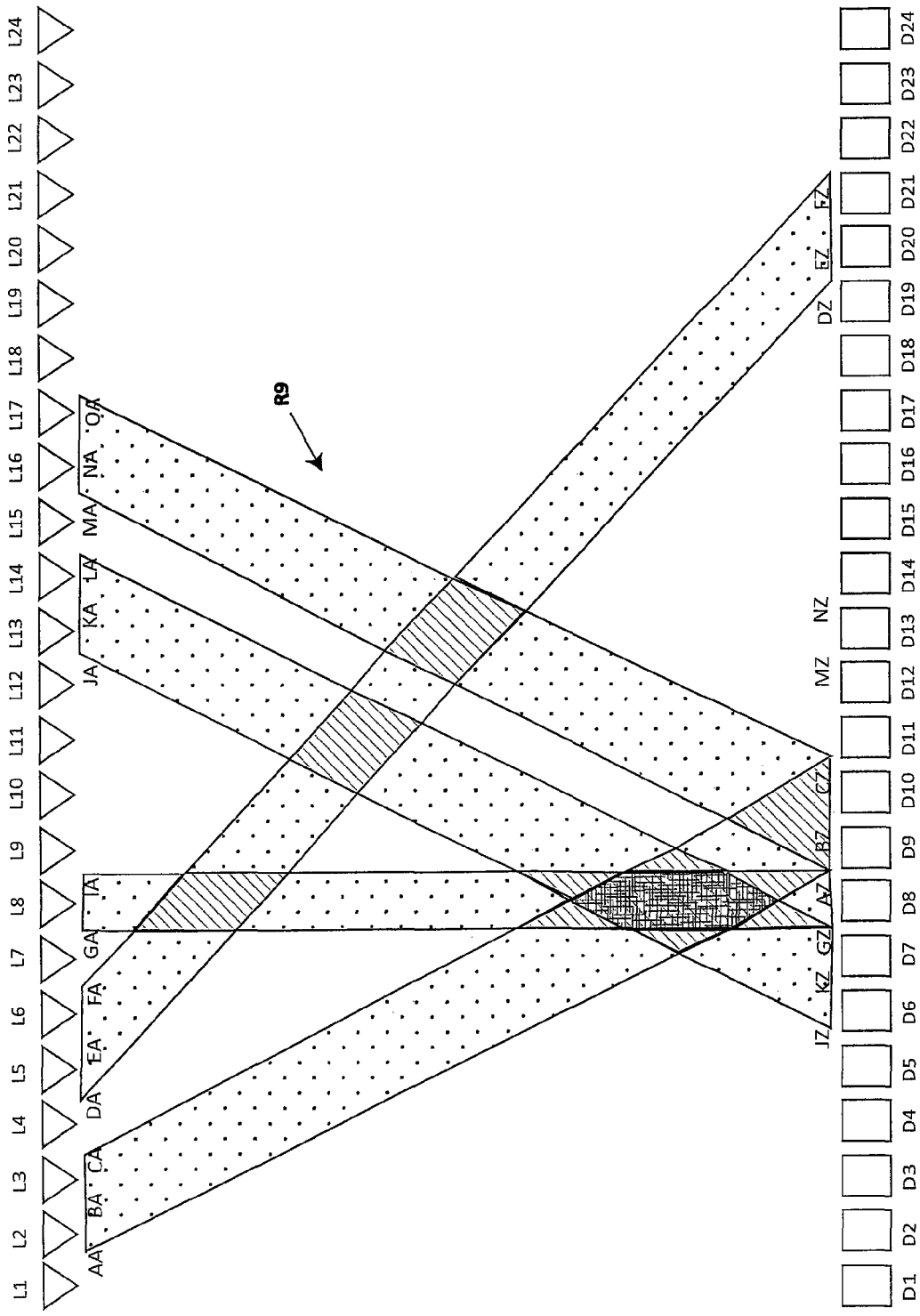
FIG. 24 shows R9, a set of overlay regions.
Figure 25:
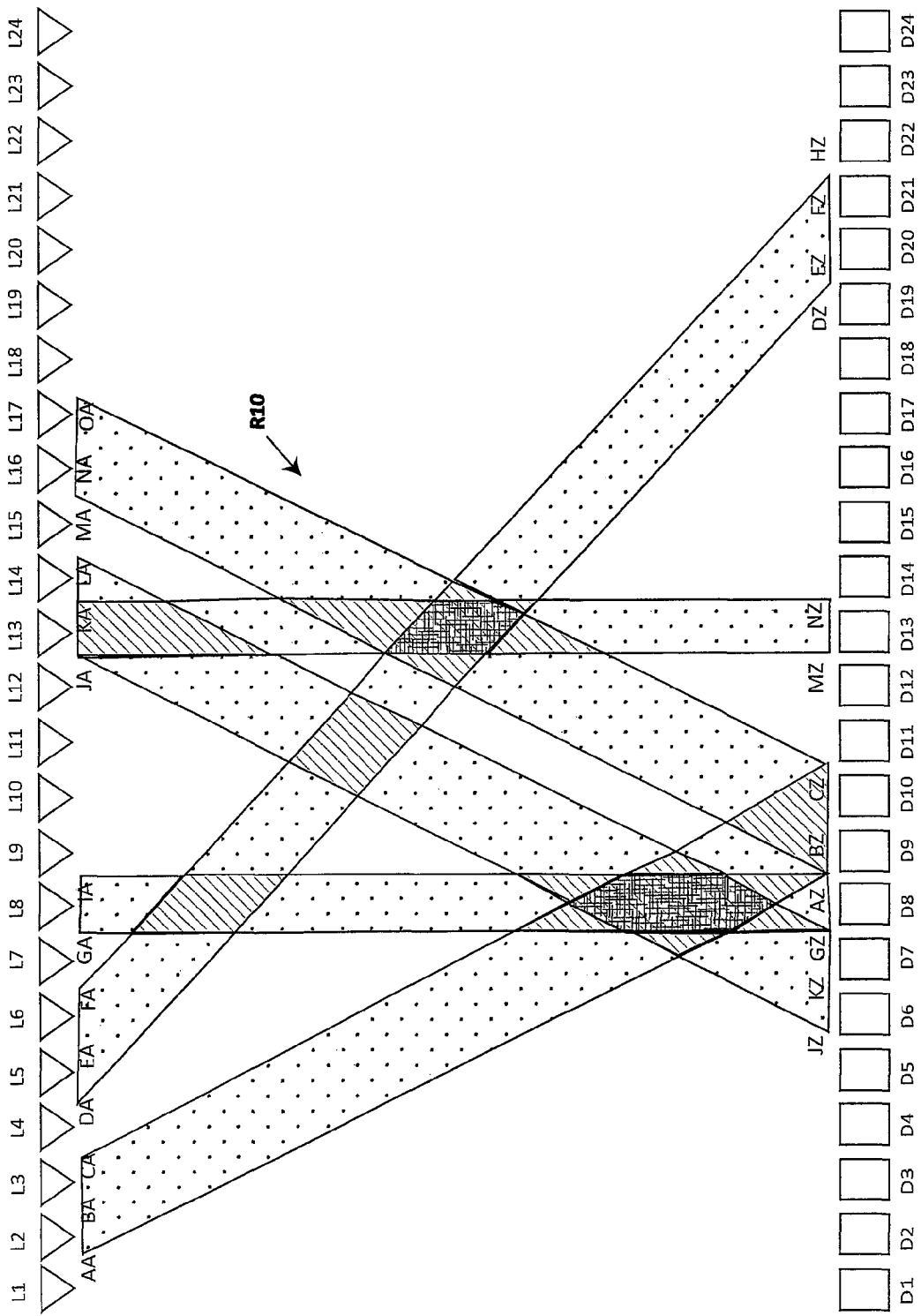
FIG. 25 shows R10, a set of overlay regions.
Figure 26:
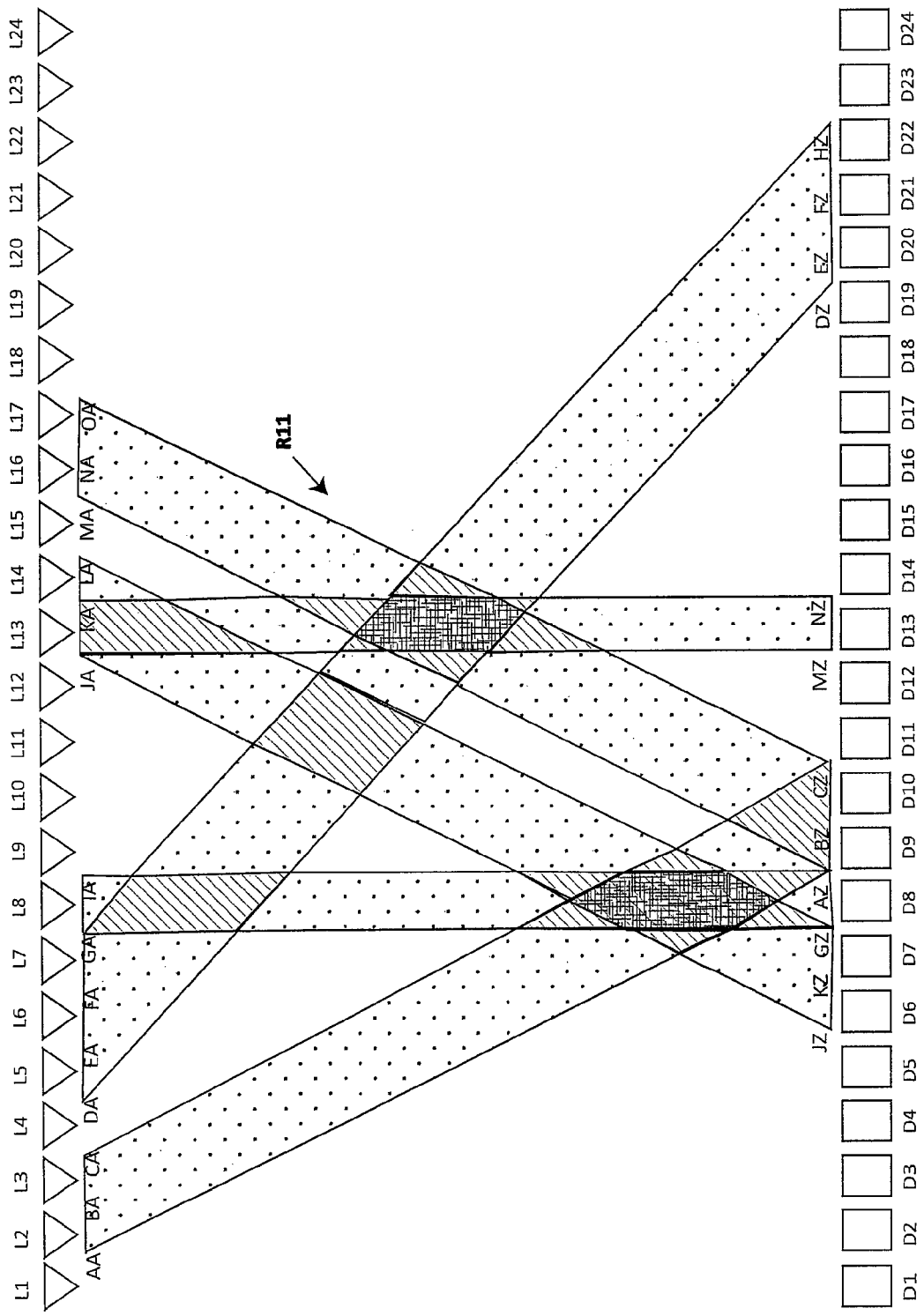
FIG. 26 shows R11, a set of overlay regions.

The calculation is similar to the calculation of overlay regions except that the filter region F is not applied. Overlay regions Q can be seen in FIG. 15.

Figure 12:
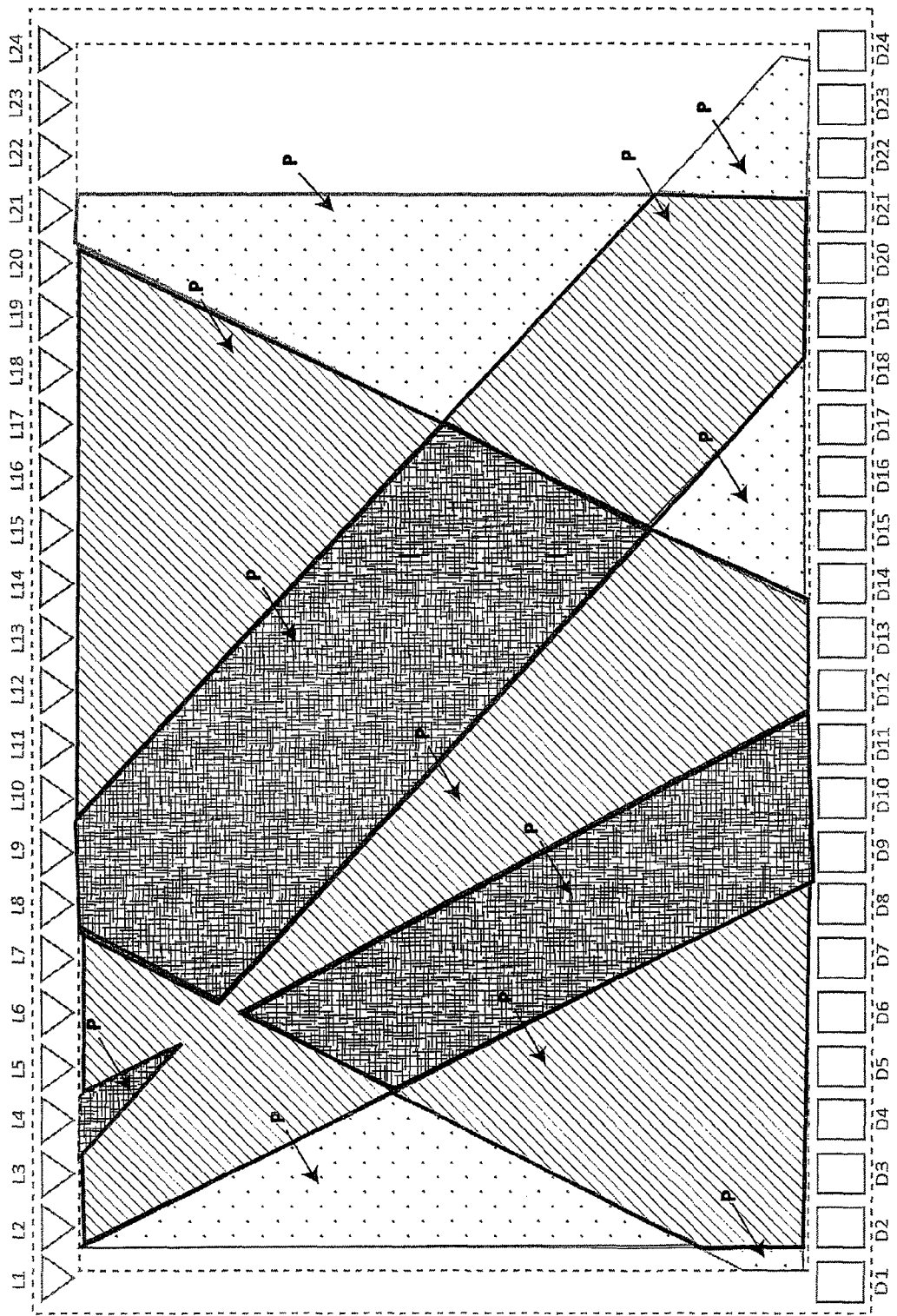
FIG. 12 shows P, a predetermined overlay region.

The next thing to do in step (c) is to calculate expected object area S by comparing R and a predetermined overlay region P. In this first preferred embodiment, P is set to be Q which is previously calculated. FIG. 12 shows the overlay region P. Expected object area S are computed as:

$$S = \bigcup_{i=1}^{NP} SelectCompare(x_i, c_i, \varepsilon, R),$$

where $P = \{\langle x_1, c_1\rangle, \ldots, \langle x_{NP}, c_{NP}\rangle\}$ and $\varepsilon = 0$ or a small integer and $$SelectCompare(x, c, \varepsilon, B) = \begin{cases} \{x\}, & \text{if exists } y \text{ that } x \subseteq y \text{ and} \\ & \langle y, c - \varepsilon\rangle \in B \\ \Phi, & \text{otherwise} \end{cases}$$

In this embodiment, we set $\varepsilon=0$. However, in other embodiments, $\varepsilon$ can be a small integer such as 1 or 2, etc.

In an ideal situation, the light intensity data are all acquired in one shot or in a very small duration. However, there are some cases that the acquiring time cannot be ignored. For example, in case that the touch object moves extremely fast, the light intensity acquired by different light sensors is sampled at different time one after another, which causes some of the hot regions to shift away from its actually position during the elapsed time. By increasing the value, this invention can be more robust to detect fast moving objects.

In this embodiment, we compare the overlay regions R and Q to find the common regions labeled with the same c.

For example, the overlay region <BG_CJ_CK,3> is in R (or $R_9$) and the overlay region <bc, 3> is in Q. The region of BG_CJ_CK and the region of bc is equivalent to each other because they mark the same region in FIG. 6 and FIG. 7. They are also labeled with the same c=3. The comparison matches so that bc (or BG_CJ_CK) is part of the expected object area S.

In this embodiment, for example, the common regions are {<ad,3>, <bd,3>, <bc,3>, <ae,3>, <hg,3>, <fh,3>, <hh,3>, <fi,3>, <ej,3>, <ek,3> <u5,2>}, so S={ad, bd, bc, ae, hg, fh, hh, fi ej, ek, u5}, as seen in FIG. 11. Please note, the bc, ae, hg, ek, u5 regions are not the regions fully occupied by any touch objects. This is because in order to reduce the complexity to illustrate the method step by step, we chose a very small subset of all available light paths in the very beginning of this embodiment. In addition, there is no left and right light transmitters and light sensors on the touch panel, thus fewer light paths are available.

The more light paths are included and the more accurate the final convex contour of the touch objects can be detected.

In a second preferred embodiment, step (c) is processed in a different way, which is slightly faster. For the second preferred embodiment, overlay region $R_i$ is calculated as:

$$R_0 = \bigcup_{k=1}^{NQ} \{\langle(F \cap x_k), c_k\rangle\},$$

where $Q = \{\langle x_1, c_1\rangle, \ldots, \langle x_{NQ}, c_{NQ}\rangle\}$ $$R_i = \bigcup_{k=1}^{NR_{i-1}} \{\langle F \cap x_k, c_k - f(F \cap x_k, h_i)\rangle\}, \text{ if } i > 0,$$

where $R_{i-1} = \{\langle x_1, c_1\rangle, \ldots, \langle x_{NR_{i-1}}, c_{NR_{i-1}}\rangle\}$ where F is a filter region and $$f(a, b) = \begin{cases} 1, & \text{if } a \subseteq b \\ 0, & \text{otherwise} \end{cases}$$

The different overlay regions R1 through R11 are shown in FIGS. 16-26.

In this embodiment, $R_0$ is initialized to be the pre-calculated set Q filtered by F. In this example, we use the whole touch region W as the alter so that $R_0=Q$.
$R_0=\{<a1,2>, <a2,2>, <a3,2>, <a4,2>, <a5,3>, \ldots <b1,2>, <b2,2>, <b3, 2>, <b4, 3>, \ldots\}$
To overlay hot region $h_1$ (A1_B1_B2_A2) on $R_0$:
$R_1=\{<a1,1>, <a2,1>, <a3,1>, <a4,1>, <a5,2>, \ldots <b1,2>, <b2,2>, <b3,2>, <b4,3>, \ldots\}$
To overlay hot region $h_2$ (B1_C1_C2_B2) on $R_1$:
$R_2=\{<a1,1>, <a2,1>, <a3,1>, <a4,1>, <a5,2>, \ldots <b1,1>, <b2,1>, <b3,1>, <b4,2>, \ldots\}$
. . . .
To overlay hot region $h_9$ (F1_G1_H2_F2) on $R_8$ $$R_9 = \{\langle a1, 1\rangle, \langle a2, 1\rangle, \langle a3, 1\rangle, \ldots, \langle ad, 0\rangle, \langle ae, 0\rangle,$$
$$\langle af, 1\rangle, \ldots, \langle b1, 1\rangle, \langle b2, 1\rangle, \langle b3, 1\rangle, \ldots, \langle bc, 0\rangle, \langle bd, 0\rangle,$$
$$\ldots, \ldots \langle e1, 1\rangle, \ldots, \langle ej, 0\rangle, \langle ek, 0\rangle, \ldots, \langle f1, 1\rangle, \ldots,$$
$$\langle fh, 0\rangle, \langle fi, 0\rangle, \ldots, \langle h1, 1\rangle, \ldots, \langle hg, 0\rangle, \langle hh, 0\rangle, \ldots, \ldots\}$$

Regions (e.g. $h_i$) and overlay regions (e.g. $R_i$) can be stored in a processor's memory or computer's main memory or graphics card memory using vector and/or raster and/or 3D z-order data structures. The use of vector format to represent regions and overlay regions allows high precision, consumes less memory and fast geometry calculation. The use of raster or 3D z-order formats can also be used in graphics card acceleration. The uses of different data structures to represent the same regions and overlay regions are considered to be equivalent between each other.

The next thing to do in step (c) is to calculate expected object area S by comparing R and a predetermined overlay region P. In this embodiment, P is set to be $\{<W,0>\}$.

Expected object area S is computed as:
$S = \bigcup_{i=1}^{NR} SelectCompare(x_i, c_i, \epsilon, P)$
where $R = \{<x_i, c_i>, \ldots, <x_{NR}, c_{NR}>\}$ and $\epsilon = 0$ or a small integer
and $$SelectCompare(x, c, \varepsilon, B) = \begin{cases} \{x\}, & \text{if exists } y \text{ that } x \subseteq y \\ & \text{and } \langle y, c - \varepsilon \rangle \in B \\ \Phi, & \text{otherwise} \end{cases}$$

In this embodiment, we set $\epsilon = 0$. In this embodiment, we compare the overlay regions R and P ($=\{<W,0>\}$) to find the common regions labeled with, the same c. Since the labels in P are zeros, the expected object area is selected regions whose labels are zeros. The compared common regions are $\{<ad,0>, <bd,0>, <bc,0>, <ae,0>, <hg,0>, <fh,0>, <hh,0>, <ej,0>, <fi,0>, <ek,0>, <u5,0>\}$, so $S = \{ad, bd, bc, ae, hg, fh, hh, ej, fi, ek, u5\}$.

Now we have expected object area S, the next step is to compute the totally disconnected expected object area S'. In this example, $S = \{ad, bd, bc, ae, hg, fh, hh, ej, fi, ek, u5\}$, where regions ad, bd, bc, ae are connected, regions hg, fh, hh, ej, fi, ek are connected and u5 is connected by itself.

Figure 13:
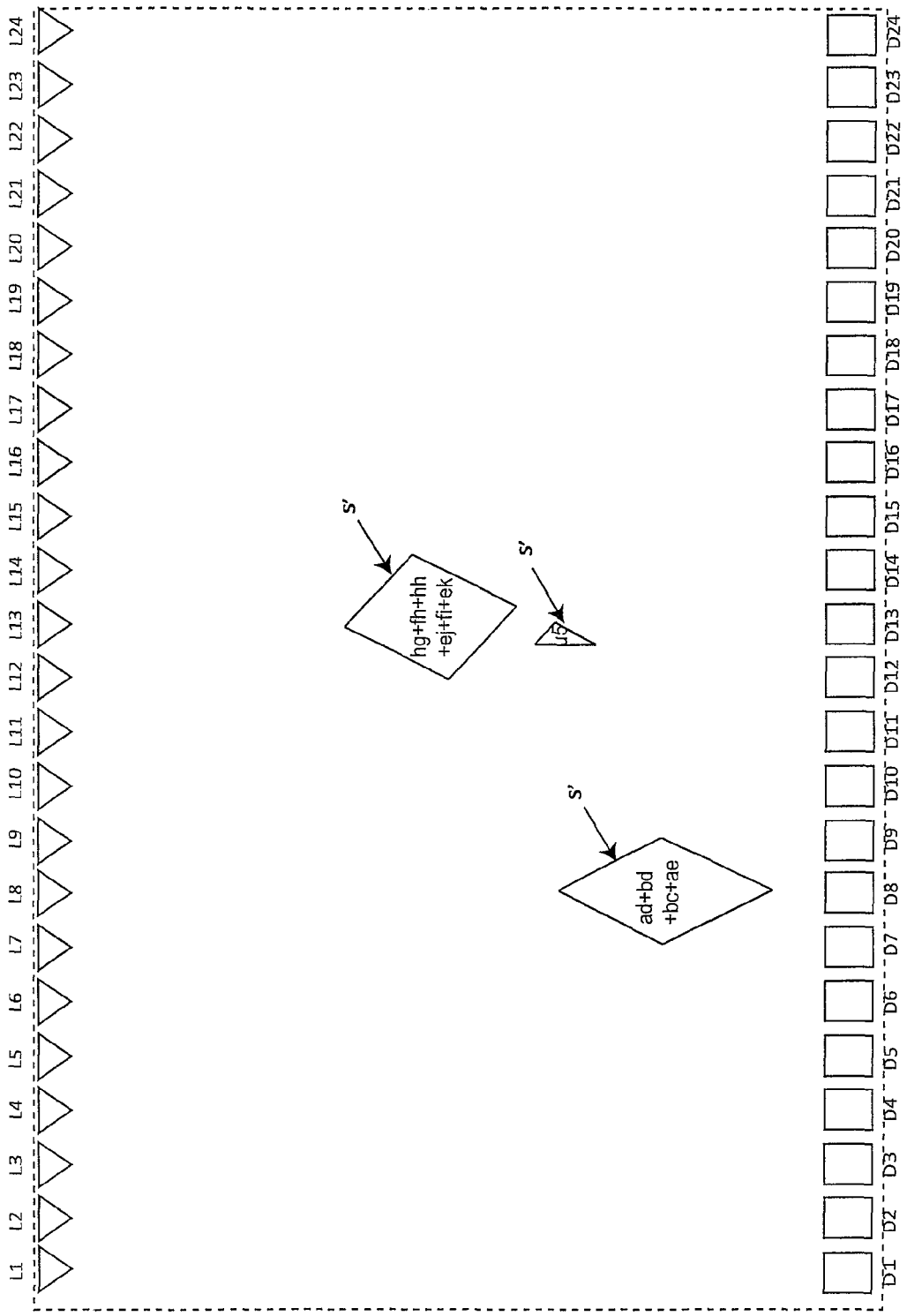
FIG. 13 shows S', totally disconnected expected object area.
Figure 27:
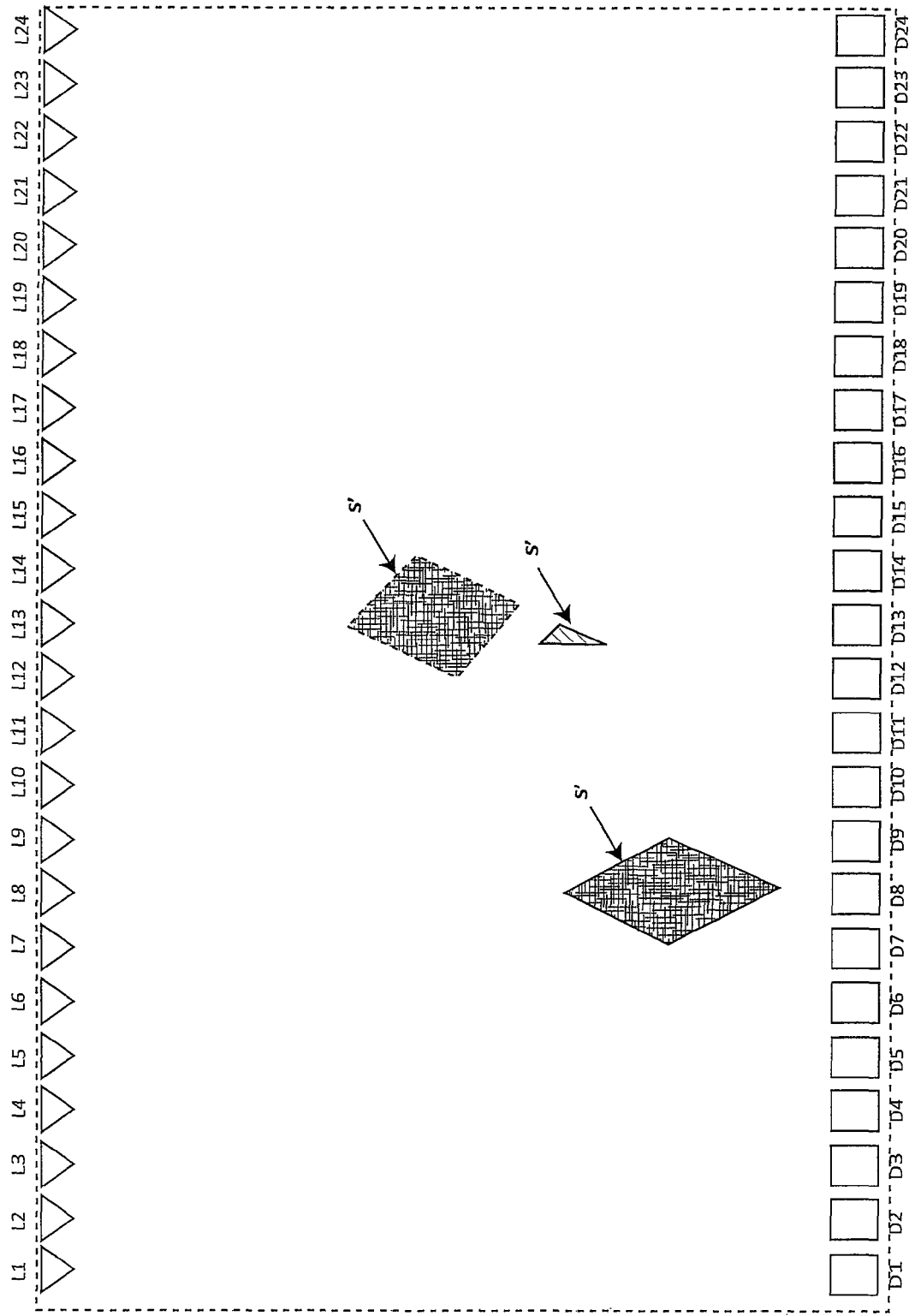
FIG. 27 shows S, expected object area by comparing the texture/color of FIG. 26 and FIG. 13.

The totally disconnected expected object area $S' = \{ad+bd+bc+ae, hg+fh+hh+ej+fi+ek, u5\}$ (shown in FIGS. 7, 13 and 27), where the regions: ad+bd+bc+ae is equivalent to BG_CJ_CK_BL_AL_AG and the regions: hg+fh+hh+ej+fi+ek is equivalent to FM_HM_HN_EO_DO_DN. The spatial properties of each totally disconnected expected object area in S' such as location, size, convex contour can be determined by analyzing the ad+bd+bc+ae region, hg+fh+hh+ej+fi+ek region and u5 region. If the size of an expected object area is too small, or the convex contour is not in an expected shape (e.g. the shape similar to finger tips) or the expected object area only appeared for an extremely short duration, the abnormal expected object area can be filtered out without being associated to a touch object. In this example, u5 is filtered out because it is small in size and is not in an expected shape. The noise u5 appears because for illustration purposes, we chose a very small subset of all available light paths in the very beginning of this embodiment. In a preferred high precision embodiment, where a complete collection of light paths is chosen, noise areas will be reduced without the need of a filtering step.

The last step (g) is to assign an ID and said spatial properties (e.g., position, size and convex contour) to each of the touch objects on the touch panel. The assignment generates a multi-dimensional touch input vector that can be used in the same way as touch input data from prior single-dimensional touch panels:

```
<
    <touch_id_1, P1, size1, convex_contour1>,
    <touch_id_2, P2, size2, convex_contour2>,
    <touch_id_3, P3, size3, convex_contour3>,
    ...
>
```

In order to assign a consistent ID to the same touch object, a temporal and spatial analysis is performed to identify the same touch object at a slightly different location detected at different times. For example, a recursive function can be defined to enumerate all possible id-to-object mappings in order to find the best mapping that minimize the global moving difference between the previous frame and the current frame.

For each frame, the steps (a), (b), (c), (d), (e), (f), (g) are performed. A typical implementation of the present invention performs 60 frames per second in order to continuously capture touch objects movement and assign a correct and consistent ID to the same touch object.

FIG. 8A shows a prior art LED, containing a lens 41, a wire bond 42, a reflective cavity 43, a semiconductor die 44, an anode 45 and a cathode 46. FIG. 8B shows a LED specifically designed for the present invention having a wider x-axis view angle than y-axis view angle. FIG. 9A shows the cross section 47 of lens used in prior art LEDs is a circle. FIG. 9B shows the cross section 48 of lens for one embodiment of the present invention is an ellipse. This structure allows more energy to be focused and directed towards the light sensor array at the opposite side and reduces energy waste on other directions.

A further improvement in the specific LED or light transmitter design for the present invention involves coating with a reflective material around at least a portion of the surface of the light transmitter. This allows light energy previously escaping to other directions to be bounced back and forth until reaching a proper escaping direction. Thus, light energy is more focused and directed towards the light sensors in the present invention.

In another preferred embodiment, there is at least one internal processor in communication with said at least one light sensor so as to obtain light intensity data. Further, at least one external processor is configured to communicate with said at least one internal processor to accelerate the calculation of overlays. Such external processor can be a computer processor and/or a computer graphics card. The communication protocol need to be high bandwidth and with little latency. In one preferred embodiment, such communication protocol can be USE or Ethernet.

The invention claimed is:

1. A method for detecting an id, position, size and convex contour of at least one touch object placed on a touch region W within a perimeter of a touch panel, the touch panel including on its periphery at least one light transmitter and at least one light sensor, said method comprising steps of:
   (a) acquiring light intensity data from a subset of light paths L between at least one light transmitter and at least one light sensor of the touch panel, at least one of the light paths being interrupted by placement of at least one touch object within the touch region W;

(b) computing hot regions H={$h_i$: i≤NH, where $h_i$ is the $i_{th}$ hot region and NH is the number of hot regions} from a subset of said light intensity data by calculating the shape and boundary of interrupted light paths;

(c) computing expected object area S by overlaying said hot regions H and comparing it with a predetermined overlay region P;

(d) deriving totally disconnected expected object area S' from S;

(e) computing spatial properties, including position, size and convex contour, of said totally disconnected expected object area S';

(f) associating touch objects with a subset of said totally disconnected expected object area S';

(g) assigning to each said touch objects an ID and said spatial properties as a touch input vector representing the placement of each touch object on the touch panel.

2. The method as in claim 1, wherein said step of (c) computing expected object area S by overlaying said hot regions H and comparing it with a predetermined overlay region P further comprises the steps of:

(1) predetermining regions G from said subset of light intensity data wherein the light intensity data are filled with zeros or a value below a predefined threshold;

(2) predetermining overlay region Q=$Q_{NG}$, where $Q_{NG}$ is recursively defined as:

$$Q_i = \begin{cases} \left\{\left(\left(g_i - \bigcup_{k=1}^{NQ_{i-1}} x_k\right), 1\right)\right\} \cup \bigcup_{k=1}^{NQ_{i-1}} \{\langle(x_k \cap g_i), c_k + 1\rangle\} \cup \{\langle x_k - g_i, c_k\rangle\} & \text{if } i > 1, \\ \quad \text{and } Q_{i-1} = \{\langle x_1, c_1\rangle, \ldots, \langle x_{NQ_{i-1}}, c_{NQ_{i-1}}\rangle\} \\ \quad \text{and } G = \{g_1, \ldots, g_{NG}\} \\ \{\langle g_1, 1\rangle\}, & \text{if } i = 1 \end{cases}$$

(3) initializing overlay region $R_0$;

(4) computing the overlay of each hot region $h_i$ on $R_{i-1}$ and assigning said overlay to $R_i$;

(5) repeating (4) in iterations until $R_{NH}$ is calculated and assigning R=$R_{NH}$; and (6) computing expected object area S by comparing the difference between R and a predetermined overlay region P.

3. The method of claim 2, wherein $R_0$ is initialized to be Q filtered by F as:

$$R_x = \bigcup_{k=1}^{NQ} \{\langle(F \cap x_k), c_k\rangle\},$$

where Q={<$x_i$, $c_i$>, . . . , <$x_{NQ}$, $c_{NQ}$>} where F is a filter region;

said predetermined overlay region P=<W,0>}; said step of (4) said overlay of each hot region $h_i$ on $R_{i-1}$ is computed as:

$$R_i = \bigcup_{k=1}^{NR_{i-1}} \{\langle F \cap x_k, c_k - f(F \cap x_k, h_i)\rangle\}, \text{ if } i > 0,$$

where $R_{i-1} = \{\langle x_1, c_1\rangle, \ldots, \langle x_{NR_{i-1}}, c_{NR_{i-1}}\rangle\}$ where F is a filter region;

$$f(a, b) = \begin{cases} 1, & \text{if } a \subseteq b \\ 0, & \text{otherwise} \end{cases}$$

and said step of (6) said expected object area S is computed as:

$$S = \bigcup_{i=1}^{NR} SelectCompare(x_i, c_i, \varepsilon, P),$$

where $R = \{\langle x_1, c_1\rangle, \ldots, \langle x_{NR}, c_{NR}\rangle\}$ and $\varepsilon = 0$ or a small integer and -continued $$SelectCompare(x, c, \varepsilon, B) = \begin{cases} \{x\}, & \text{if exists } y \text{ that } x \subseteq y \\ & \text{and } \langle y, c - \varepsilon\rangle \in B \\ \Phi, & \text{otherwise} \end{cases}.$$

4. The method as in claim 3, where said filter region F is one of (a) said whole touch region W; (b) a predefined region of interest ROI; (c) $\bigcup_{i=1}^{NH'} \{h'_1\}$, where H'={$h'_1$, . . . $h'_{NH'}$} and H' is a subset of H.

5. The method as in claim 2, wherein $R_0$ is initialized to be an empty set { }; said predetermined overlay region P=Q; said step of (4) said overlay of each hot region $h_i$ on $R_{i-1}$ is computed as:

$$R_i = \begin{cases} \left\{\left(\left(F \cap h_i - \bigcup_{k=1}^{NR_{i-1}} x_k\right), 1\right)\right\} \cup \bigcup_{k=1}^{NR_{i-1}} & \text{if } i > 1, \\ \quad \text{where } R_{i-1} = \{\langle x_1, c_1\rangle, \ldots, \langle x_{NR_{i-1}}, c_{NR_{i-1}}\rangle\} \\ \{\langle(x_k \cap h_i), c_k + 1\rangle\} \cup \{\langle x_k - h_i, c_k\rangle\}, \\ \{\langle(F \cap h_i), 1\rangle\}, & \text{if } i = 1 \end{cases}$$

where F is a filter region and said step of (6) said expected object area S is computed as:

$$S = \bigcup_{i=1}^{NP} SelectCompare(x_i, c_i, \varepsilon, R),$$

where $P = \{\langle x_1, c_1 \rangle, \ldots, \langle x_{NP}, c_{NP} \rangle\}$ and $R = 0$ or a small integer and $$SelectCompare(x, c, \varepsilon, B) = \begin{cases} \{x\}, & \text{if exists } y \text{ that } x \subseteq y \text{ and } \langle y, c - \varepsilon \rangle \in B \\ \Phi, & \text{otherwise} \end{cases}.$$

6. The method as in claim 5, where said filter region F is one of (a) said whole touch region W; (b) a predefined region of interest ROI; (c) $\bigcup_{i=1}^{NH'} \{h'_1\}$, where $H'=\{h'_1, h'_{NH'}\}$ and H' is a subset of H.

7. The method as in claim 2, where said overlay regions and predetermined overlay regions P, Q are stored in memory using vector and/or raster and/or 3D data structures.

8. The method as in claim 1, wherein the at least one light transmitter positioned, along with the at least one light sensor, around at least a portion of the perimeter of the touch panel comprises:
   a LED semiconductor die and a lens, wherein said lens has a wider x-axis view angle than y-axis view angle.

9. The method as in claim 8, wherein the cross section of said lens is an ellipse.

* * * * *